United States Patent
Tagalpallewar et al.

(12)

(10) Patent No.: US 12,488,630 B2
(45) Date of Patent: Dec. 2, 2025

(54) METHOD AND APPARATUS MONITORING OPERATION OF A WORK VEHICLE ATTACHMENT FOR SCHEDULING MAINTENANCE

(71) Applicant: Deere & Company, Moline, IL (US)

(72) Inventors: Nikhil D. Tagalpallewar, Kinwat (IN); Gopal M. Goenka, Pune (IN); Bharat J. Joshi, Pune (IN); Vishwanath V. Patil, Pune (IN); Jose I. Vazquez, Monterrey (MX); Daniel Chapa Montemayor, Monterrey (MX); Gerardo Gonzalez Castañeda, Monterrey (MX); Jesus A. Montalvo Urbina, Guadalupe (MX)

(73) Assignee: Deere & Company, Moline, IL (US)

( * ) Notice: Subject to any disclaimer, the term of this patent is extended or adjusted under 35 U.S.C. 154(b) by 165 days.

(21) Appl. No.: 18/356,560

(22) Filed: Jul. 21, 2023

(65) Prior Publication Data
US 2025/0029430 A1   Jan. 23, 2025

(51) Int. Cl.
*G07C 5/00* (2006.01)
*E02F 3/34* (2006.01)
(Continued)

(52) U.S. Cl.
CPC ............ *G07C 5/006* (2013.01); *E02F 3/3417* (2013.01); *E02F 9/264* (2013.01); *E02F 9/267* (2013.01);
(Continued)

(58) Field of Classification Search
None
See application file for complete search history.

(56) References Cited

U.S. PATENT DOCUMENTS

| | | | |
|---|---|---|---|
| 6,263,039 B1 * | 7/2001 | Ducharme | G01G 19/08 377/9 |
| 6,765,607 B2 | 7/2004 | Mizusawa et al. | |

(Continued)

FOREIGN PATENT DOCUMENTS

| | | | |
|---|---|---|---|
| CA | 2097204 A1 * | 12/1993 | G07C 3/00 |
| CN | 114406985 A | 4/2022 | |

(Continued)

OTHER PUBLICATIONS

Extended European Search Report dated Aug. 23, 2023 for Application Serial No. 23166423.6 (6 pages).

(Continued)

*Primary Examiner* — Abdhesh K Jha
(74) *Attorney, Agent, or Firm* — Tucker Ellis LLP

(57) ABSTRACT

Apparatus and methods are provided for monitoring usage operation of equipment carried on a vehicle. A vision system generates target device data representative of an obtained image of a set of target devices carried on a loader. Loader monitoring logic is executed by a processor to determine a current loader movement of the loader from first to second loader poses based on the target device data. Maintenance alert data is generated based on a sum of a first time duration of the current loader movement and an aggregated time duration of previously determined loader movements of the loader exceeding a predetermined loader maintenance time threshold. A maintenance alert image is generated based on the maintenance alert data and is displayed on a screen viewable by an operator. The maintenance alert image includes maintenance notification information to alert the operator of required loader maintenance.

21 Claims, 10 Drawing Sheets

(51) Int. Cl.
  *E02F 9/26* (2006.01)
  *G06T 7/254* (2017.01)
  *G07C 5/08* (2006.01)

(52) U.S. Cl.
  CPC ............ *G06T 7/254* (2017.01); *G07C 5/0808* (2013.01); *G07C 5/0825* (2013.01); *G06T 2207/30252* (2013.01)

(56) References Cited

U.S. PATENT DOCUMENTS

| | | | |
|---|---|---|---|
| 6,970,184 B2 | 11/2005 | Hirama et al. | |
| 7,752,778 B2 | 7/2010 | Schoenmaker et al. | |
| 7,797,860 B2 | 9/2010 | Schoenmaker et al. | |
| 8,600,627 B2* | 12/2013 | Beck | A01D 75/18 701/34.2 |
| 9,139,977 B2 | 9/2015 | Mccain et al. | |
| 10,106,072 B2 | 10/2018 | Liñan et al. | |
| 10,106,951 B2 | 10/2018 | Myers | |
| 10,132,060 B2 | 11/2018 | Forcash et al. | |
| 10,351,061 B1 | 7/2019 | Chaudhari | |
| 10,586,349 B2 | 3/2020 | Li et al. | |
| 11,338,940 B2* | 5/2022 | Wang | G07C 5/0808 |
| 11,401,684 B2 | 8/2022 | Berry et al. | |
| 2001/0009206 A1* | 7/2001 | Lines | G01G 19/08 177/136 |
| 2002/0059075 A1 | 5/2002 | Schick | |
| 2002/0125018 A1 | 9/2002 | Bernhardt et al. | |
| 2004/0054457 A1* | 3/2004 | Kormann | G07C 5/085 701/1 |
| 2005/0085973 A1 | 4/2005 | Furem et al. | |
| 2014/0146167 A1 | 5/2014 | Friend et al. | |
| 2014/0151979 A1 | 6/2014 | Puckett et al. | |
| 2015/0379785 A1* | 12/2015 | Brown, Jr. | A01F 15/08 802/29.1 |
| 2016/0312432 A1 | 10/2016 | Wang et al. | |
| 2017/0002547 A1 | 1/2017 | Omote | |
| 2018/0080193 A1 | 3/2018 | Myers | |
| 2018/0245316 A1 | 8/2018 | Forcash et al. | |
| 2019/0009817 A1 | 1/2019 | Bradley et al. | |
| 2020/0205911 A1 | 7/2020 | Hufford | |
| 2020/0279397 A1 | 9/2020 | Cheng et al. | |
| 2020/0363815 A1 | 11/2020 | Mousavian et al. | |
| 2021/0043085 A1 | 2/2021 | Kreiling et al. | |
| 2021/0127550 A1 | 5/2021 | Ohrstrom et al. | |
| 2021/0301494 A1 | 9/2021 | Berry et al. | |
| 2022/0112696 A1 | 4/2022 | Sud et al. | |
| 2022/0332248 A1 | 10/2022 | Vazquez et al. | |
| 2022/0332249 A1 | 10/2022 | Vazquez et al. | |
| 2023/0340757 A1 | 10/2023 | Tagalpallewar et al. | |

FOREIGN PATENT DOCUMENTS

| | | |
|---|---|---|
| EP | 4086392 A1 | 11/2022 |
| EP | 4265849 A1 | 10/2023 |
| FR | 3033053 A1 | 8/2016 |
| WO | 2017207522 A1 | 12/2017 |

OTHER PUBLICATIONS

Final Office Action mailed Feb. 15, 2024 for U.S. Appl. No. 17/230,093 (6 pages).
Non-Final Office Action mailed Oct. 30, 2023 for U.S. Appl. No. 17/230,093 (13 pages).
Final Office Action mailed Feb. 15, 2024 for U.S. Appl. No. 17/724,598 (6 pages).
Non-Final Office Action dated Oct. 27, 2023 for U.S. Appl. No. 17/724,598 (13 pages).
Non-Final Office Action dated Apr. 19, 2024 for U.S. Appl. No. 17/725,032 (16 pages).
Extended European Search Report and Written Opinion issued in European Patent Application No. 24185862.0 dated Dec. 13, 2024, in 07 pages.
Extended European Search Report and Written Opinion issued in European Patent Application No. 24186696.1 dated Dec. 23, 2024, in 08 pages.
Extended European Search Report and Written Opinion issued in European Patent Application No. 24185861.2 dated Dec. 6, 2024, in 05 pages.
Non-Final Office Action dated Aug. 23, 2024 for U.S. Appl. No. 17/725,032 (18 pages).
Non-Final Office Action dated Jun. 2, 2025 for U.S. Appl. No. 18/356,558 (54 pages).
Final Office Action dated Sep. 9, 2025 for U.S. Appl. No. 18/356,558 (23 pages).

\* cited by examiner

METHOD AND APPARATUS MONITORING OPERATION OF A WORK VEHICLE ATTACHMENT FOR SCHEDULING MAINTENANCE

FIELD OF THE DISCLOSURE

The embodiments herein are directed to methods and apparatus monitoring operation of equipment mounted on a work vehicle. Although the example embodiments will be described as methods and apparatus that monitor and report usage hours of equipment in the form of a loader coupled with an agricultural work vehicle, it is to be appreciated that the embodiments are not limited to those particular uses or applications, and instead may be used anywhere there is a desire to provide an equipment operator or other supervisory entity with other usage factors and information related to the exercise of the equipment.

BACKGROUND

Many work vehicles having machine attachments for manipulating loads or the like offer load manipulation that is outside of the strength and reach capabilities of the human body due for example to load size and the natural capacities or incapacities of human workers. Such machine attachments may include for example hydraulic boom mechanisms for example that couple with a further attachment such as an implement, a tool or the like on the end of the boom that is then in turn used to lift or otherwise manipulate the heavy, large, or otherwise awkward loads. In addition, in some machines or work vehicles such as tractors outfitted with such boom mechanisms and tool carriers, commonly referred to in this context as "loaders," the tool carrier on the free end of the loader is typically provided with one or more connection features such as one or more pins or the like and, correspondingly, the implement is similarly provided with one or more connection features such as one or more hooks or the like. The pins and hooks may be selectively mutually coupled for attaching the implement onto the tool carrier on the end of the loader, and they may be similarly selectively mutually decoupled for disconnecting the implement from the tool carrier of the loader so that another different tool may be attached to the loader. Various additional operations may therefore be performed for manipulating the load by using the implement that is attached or otherwise coupled with the tool carrier of the loader.

Given that these kinds of machine attachments are capable of lifting and otherwise manipulating heavy work load objects, and further given that these kinds of machine attachments are often used in potentially hostile environments, it is important to perform frequent checks for wear and possible breakage that might damage parts of the implement or the loader, cause damage to the work load objects, or adversely affect the machine operation in general because of loose joints, couplings, bearings, bushings, or the like.

Agricultural work vehicles in particular are frequently subjected during their operation to a considerable amount of wear. In the case of a resale the price that can be obtained for such a vehicle depends thereby among other factors upon the number of hours of operation previously accrued as determined by basic "hour meter" devices that simply tool the time that the work vehicle is "ON" such as for example, by logging the time that the ignition switch of the vehicle is in an "ON" position, or the like. The number of hours of operation accrued is also significant for the maintenance of the service intervals and warranty questions of the vehicle. In the case of self-propelled machines, such as combines, forage harvesters, and tractors, operating hour counters are available as a rule on the basis of which the hours of operation of the work vehicle recorded to date can be documented. However, such arrangements do not exist for attachments to the work vehicle, or attached tools, such as front harvesting attachments, ground breaking implements or implements for the application of fertilizer, plant protection materials or seed crop, boom mechanisms, loaders, and the like.

In addition, the basic "hour meters" that have been used to schedule inspections and preventative maintenance of the work vehicles that carry and support the attachments are not always useful for scheduling the maintenance of the attachments themselves because there may be some uncertainty in the correlation between the work vehicle usage time that tolls the hour meter, and the actual attachment usage time that does not toll the meter. Scheduling inspection or maintenance of work vehicle attachments separately from the scheduling of maintenance for the supporting work vehicle is desirable.

As a possible solution, inspection of equipment attached with a work vehicle may be scheduled simply based on calendar time. The time period between equipment inspections can be adjusted, more or less, based on the type of work being performed, the work environment, or on one or more characteristics of the work load objects.

Scheduling machine inspection or maintenance based on an actual usage time of the work vehicle attachment would be preferred, however, because wear and possible damage to the attached equipment is more likely correlated with its actual usage time than with a simple calendar time schedule protocol.

However, it is difficult in practice for operators of work vehicles to manually track usage time of attachments supported by the vehicle, particularly while simultaneously using the equipment to perform a work function.

As a possible further proposed solution such as disclosed in US 2004/0054457, an operating parameter signal is generated that contains information about the operation of an implement attached with a working vehicle such as a harvesting machine or the like. The operating parameter signal is generated by an operating parameter detection arrangement and is conducted to a memory that stores operating parameter documentation information in the memory, that is derived from the operating parameter signal or that corresponds to the latter. In this way information about the operation of the attached implement is stored in memory. It can later be recalled for the detection of operating data (for example, for the calculation for contractors), for purposes of service or for a control of machine usage. In the case of a resale it is known how many hours the attached implement has been operated and/or to which loads it has been exposed. This solution includes a pair of devices that are disposed separately in application. The first device is located on the work vehicle, and second device is located on the attachment. The devices are in operative communication with each other for communicating attachment usage information therebetween.

However, this solution places electronics that are capable of detecting the attachment usage information and that are capable of communication with the electronics of the supporting work vehicle directly on the attachment itself.

It is desirable to monitor operation of a work vehicle attachment for scheduling maintenance using an apparatus that is disposed on the supporting work vehicle, rather than on the attachment, so that attachments of any type and from any vendor may be monitored equivalently.

In general then, accurate tracking of machine usage time helps with ensuring the timely performance of maintenance schedules which in turn helps prevent machine downtime caused by inoperability of the machine. Machine uptime is highly desirable, but is dependent on strict adherence to timely maintenance that is typically driven by some notion of machine usage.

It is therefore desirable to provide methods and apparatus that automatically monitor one or more machine usage factors such as a usage time of an attachment on a work vehicle, for example.

It is further desirable to provide methods and apparatus that automatically report one or more machine usage factors such as a machine usage time for example to an operator of a work vehicle or to a supervisory controller or the like so that the operator or the supervisory controller or the like may take appropriate action.

It is still further desirable to provide methods and apparatus that automatically generate an alert signal when one or more machine usage factors such as a machine usage time for example exceed a predetermined usage factor threshold so that an operator of a work vehicle or a supervisory controller or the like may take appropriate remedial action.

SUMMARY

The embodiments herein are directed to methods and apparatus monitoring operation of equipment mounted on a work vehicle.

An embodiment herein is directed to methods and systems that monitor operation of a work vehicle attachment such as for example a loader carried on a tractor.

An embodiment herein is directed to methods and systems that automatically monitor one or more machine usage factors such as a usage time of a loader attachment on a work vehicle, for example.

An embodiment herein is directed to methods and systems that automatically monitor usage time of a loader attachment on a work vehicle that tallies the usage time whenever any one or more portions or segments of a loader carried on a tractor is/are moved relative to the tractor and/or relative to each other.

An embodiment herein is directed to methods and systems that automatically monitor usage time of a loader attachment on a work vehicle that tallies the usage time whenever the tractor is moving even though any of the one or more portions or segments of a loader carried on a tractor are held in fixed positions relative to the tractor and/or relative to each other.

An embodiment herein is directed to methods and systems that automatically monitor usage time of a loader attachment on a work vehicle that scales the usage time based on environmental or other operating conditions of the loader and tallies the scaled usage time whenever any one or more portions or segments of a loader carried on a tractor is/are moved relative to the tractor and/or relative to each other.

An embodiment herein is directed to methods and systems that automatically monitor usage time of a loader attachment on a work vehicle that scales the usage time based on environmental or other operating conditions of the loader and tallies the scaled usage time whenever the tractor is moving even though any of the one or more portions or segments of a loader carried on a tractor are held in fixed positions relative to the tractor and/or relative to each other.

An embodiment herein is directed to methods and systems that automatically monitor one or more machine usage factors such as a usage time of a loader attachment on a work vehicle based on signals received from one or more operation environment sensors such as acoustic sensors.

An embodiment herein is directed to methods and systems that automatically monitor one or more machine usage factors such as a usage time of a boom portion of loader attachment separately from a usage time of a tool carrier portion of the loader. This is useful for providing more accurate and detailed time usage information so that the appropriate equipment specific maintenance may be performed such as for example tool carrier maintenance or loader/boom maintenance.

An embodiment herein is directed to methods and systems that automatically monitor one or more machine usage factors such as a usage time of a loader attachment on a work vehicle in combination with usage environment information such as wet weather usage or heavy load manipulation usage, for example. The usage environment information may be derived from one or more operation environment sensor and/or received in to the system from an operator providing the information manually. This is useful for providing more accurate and detailed time usage information so that the appropriate maintenance may be performed such as for example more frequent maintenance when the equipment is used in wet or other harsh environments, and appropriately less maintenance frequency when the equipment is used in dry or other moderate less harsh environments.

An embodiment herein is directed to methods and systems that automatically report one or more machine usage factors such as a machine usage time for example to an operator of a work vehicle or to a supervisory controller or the like so that the operator or the supervisory controller or the like may take appropriate action.

An embodiment herein is directed to methods and systems that automatically generate an alert signal when one or more machine usage factors such as a machine usage time for example exceed a predetermined usage factor threshold so that an operator of a work vehicle or a supervisory controller or the like may take appropriate remedial action.

In accordance with an aspect herein, an apparatus is provided for monitoring operation of a loader carried on an associated tractor. The apparatus includes a vision system, a loader monitoring control apparatus operatively coupled with the vision system, and a display unit operatively coupled with the loader monitoring control apparatus. The loader monitoring control apparatus includes a processor device, a non-transient memory device operatively coupled with the processor device and storing the target device data, a clock circuit operatively coupled with the processor device and generating a clock signal representative of a current time, and loader monitoring logic stored in the memory device. The vision system is operable to image a set of one or more target devices carried on the loader to generate target device data representative of the image of the set of one or more target devices. The display unit includes a screen that is viewable by an operator of the associated tractor. In accordance with the aspect, the processor device is operable to execute the loader monitoring logic to determine based on the target device data a current loader movement of the loader from a first loader pose to a second loader pose, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

In accordance with an aspect herein, a method of monitoring operation of a loader carried on an associated tractor is provided. A set of one or more target devices carried on the loader are imaged by a vision system to obtain target device data representative of an image of the set of one or more target devices. The target device data and loader monitoring logic are stored in a non-transient memory device of a loader monitoring control apparatus operatively coupled with the vision system and comprising a processor device operatively coupled with the memory device. A clock circuit operatively coupled with the processor device generates a clock signal representative of a current time. The loader monitoring logic is executed by the processor device to determine based on the target device data a current loader movement of the loader from a first loader pose to a second loader pose, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. A loader maintenance alert image is displayed on a screen of a display unit operatively coupled with the loader monitoring control apparatus and viewable by the operator based on the generated loader maintenance alert data, wherein the loader maintenance alert image includes loader maintenance notification information to alert the operator of required loader maintenance.

In accordance with an aspect herein, an apparatus is provided for monitoring operation of a loader carried on an associated tractor. The apparatus includes a vision system, a set of one or more target devices configured to be carried on the loader, a loader monitoring control apparatus operatively coupled with the vision system, and a display unit operatively coupled with the loader monitoring control apparatus. The loader monitoring control apparatus includes a processor device, a non-transient memory device operatively coupled with the processor device and storing the target device data, a clock circuit operatively coupled with the processor device and generating a clock signal representative of a current time, and loader monitoring logic stored in the memory device. The vision system is operable to image the set of one or more target devices carried on the loader to generate target device data representative of the image of the set of one or more target devices. The display unit includes a screen that is viewable by an operator of the associated tractor. In accordance with the aspect, the processor device is operable to execute the loader monitoring logic to determine based on the target device data a current loader movement of the loader from a first loader pose to a second loader pose, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance. The set of one or more target devices are configured to be carried on loaders from any manufacturer and may be applied onto the loaders from various manufacturers by stick-on application, fastening such as by bolts, screws, rivets, or the like or by any other means for mounting the onto the loaders from the various manufacturers.

In accordance with an aspect herein, an apparatus is provided for monitoring operation of a loader carried on an associated tractor. The apparatus includes a vision system, a loader monitoring control apparatus operatively coupled with the vision system, and a display unit operatively coupled with the loader monitoring control apparatus. The loader monitoring control apparatus includes a processor device, a non-transient memory device operatively coupled with the processor device and storing the target device data, a clock circuit operatively coupled with the processor device and generating a clock signal representative of a current time, and loader monitoring logic stored in the memory device. The vision system is operable to image an area surrounding the tractor carrying the loader to generate tractor movement data representative of the tractor driving or otherwise moving. The display unit includes a screen that is viewable by an operator of the associated tractor. In accordance with the aspect, the processor device is operable to execute the loader monitoring logic to determine based on the tractor movement data a current use of the loader, generate based on determining the loader use and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

In accordance with an aspect herein, a method of monitoring operation of a loader carried on an associated tractor is provided. A vision system is operable to image an area surrounding the tractor carrying the loader to generate tractor movement data representative of the tractor driving or otherwise moving. Loader monitoring logic is stored in a non-transient memory device of a loader monitoring control apparatus operatively coupled with the vision system and comprising a processor device operatively coupled with the memory device. A clock circuit operatively coupled with the processor device generates a clock signal representative of a current time. The loader monitoring logic is executed by the processor device to determine based on the tractor movement data a current loader movement of the loader, generate based on determining the current loader movement and the clock signal first loader usage time data representative of a first time duration of the current loader movement, and generate loader maintenance alert data based on a sum of: i)

the first time duration of the current loader movement; and ii) an aggregated time duration of one or more previously determined loader movements of the loader exceeding a predetermined loader maintenance time threshold. A loader maintenance alert image is displayed on a screen of a display unit operatively coupled with the loader monitoring control apparatus and viewable by the operator based on the generated loader maintenance alert data, wherein the loader maintenance alert image includes loader maintenance notification information to alert the operator of required loader maintenance.

In accordance with an aspect herein, an apparatus is provided for monitoring operation of a loader carried on an associated tractor. The apparatus includes a vision system, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The vision system is operable to image an area surrounding the tractor carrying the loader to generate tractor movement data representative of the tractor driving or otherwise moving. The display unit includes a screen that is viewable by an operator of the associated tractor. In accordance with the aspect, the processor device is operable to execute the loader monitoring logic to determine based on the tractor movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

In accordance with an aspect herein, an apparatus is provided for monitoring operation of a loader carried on an associated tractor. The apparatus includes an operation environment sensor, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The operation environment sensor is operable to sense operation of the loader that includes movement of the loader and generate loader movement data representative of the sensed loader movement. The display unit includes a screen that is viewable by an operator of the associated tractor. In accordance with the aspect, the processor device is operable to execute the loader monitoring logic to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance. In accordance with the aspect, the one or more operation environment sensors may be acoustic sensors configured to sense chirping or other noise generated by movement of any one or more components or portions of the loader.

In accordance with an aspect herein, a method of monitoring operation of a loader carried on an associated tractor is provided. An operation environment sensor is operable to sense operation of the loader that includes movement of the loader and generate loader movement data representative of the sensed loader movement. The loader movement data and loader monitoring logic are stored in a non-transient memory device of a loader monitoring control apparatus operatively coupled with the vision system and comprising a processor device operatively coupled with the memory device. A clock circuit operatively coupled with the processor device generates a clock signal representative of a current time. The loader monitoring logic is executed by the processor device to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. A loader maintenance alert image is displayed on a screen of a display unit operatively coupled with the loader monitoring control apparatus and viewable by the operator based on the generated loader maintenance alert data, wherein the loader maintenance alert image includes loader maintenance notification information to alert the operator of required loader maintenance. In accordance with the aspect, the one or more operation environment sensors may be acoustic sensors configured to sense chirping or other noise generated by movement of any one or more components or portions of the loader.

In accordance with an aspect herein, an apparatus is provided for monitoring operation of a loader carried on an associated tractor. The apparatus includes an operation environment sensor, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The operation environment sensor is operable to sense operation of the loader that includes movement of the loader and generate loader movement data representative of the sensed loader movement. The display unit includes a screen that is viewable by an operator of the associated tractor. In accordance with the aspect, the processor device is operable to execute the loader monitoring logic to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance. In accordance with the aspect, the one or more operation environment sensors may be acoustic sensors configured to sense chirping or other noise generated by movement of any one or more components or portions of the loader.

Other embodiments, features and advantages of the example embodiments for assisting an operator of a work vehicle to maneuver a loader of the work vehicle for handling of an attachment such as a tool or implement or the like by providing visual aids in the form of a visual movement instruction superimposed on a viewable image of the implement, wherein the visual movement instruction provides instructions to the operator for moving the loader relative to the implement for coupling the tool carrier of the loader with the implement. This helps the operator to guide operation of the loader to position a boom relative to level ground, to position a tool carrier relative to the boom, to show a preview of a path of the tool carrier, and to assist in positioning the tool carrier relative to an attachment for coupling the tool carrier with the attachment will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the disclosure are illustrated, which, together with a general descriptions given above, and the detailed description given below, serve to exemplify the embodiments of this disclosure.

DETAILED DESCRIPTION

In the following description reference is made to the accompanying figures which form a part thereof, and in which is shown, by way of illustration, one or more example embodiments of the disclosed systems and methods monitoring operation of a loader carried on an associated tractor and, in particular, monitoring usage of a loader carried on an associated tractor. Various modifications of the example embodiments may be contemplated by on of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Figure 1:
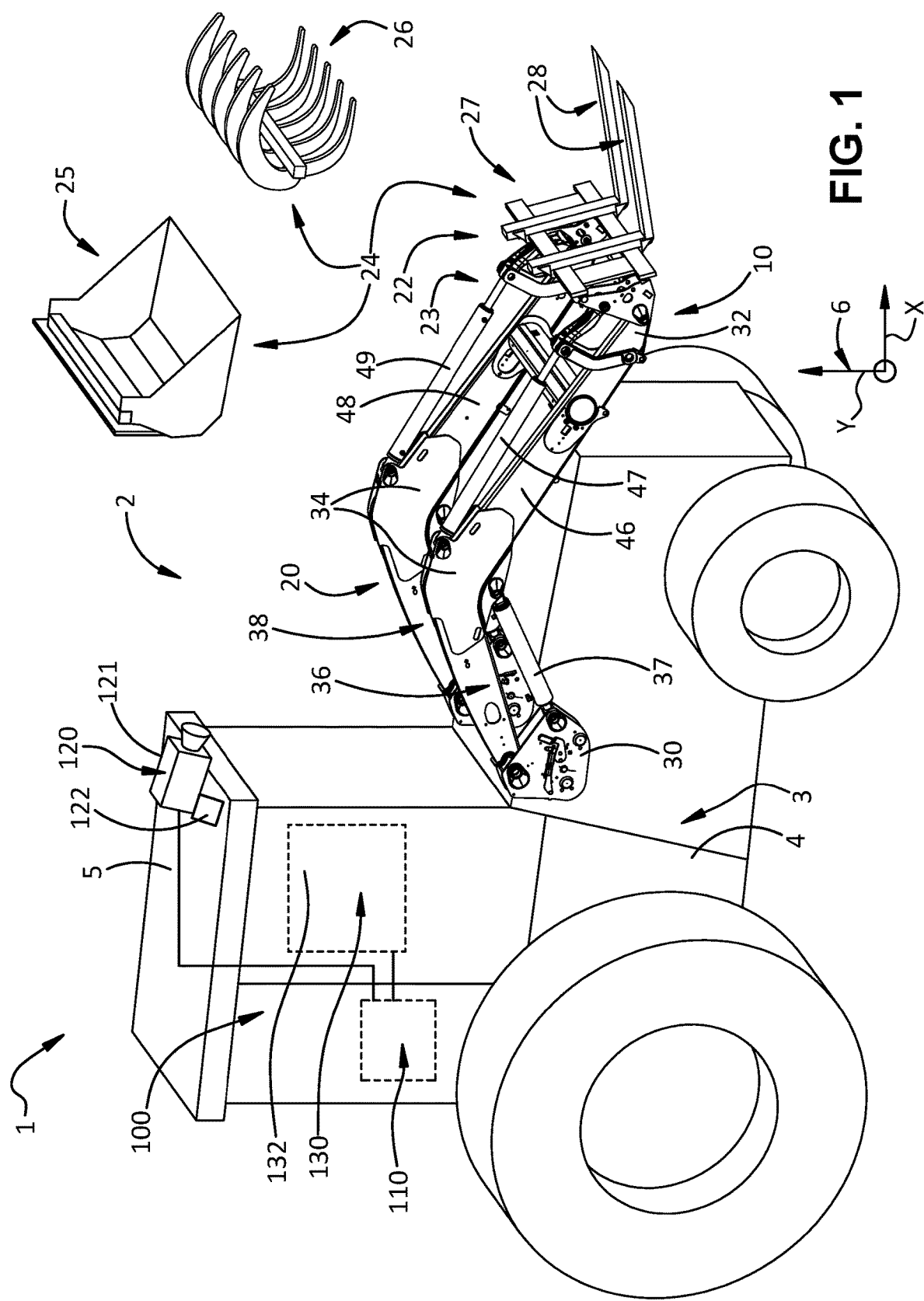
FIG. 1 is a side view of a work vehicle including a loader usage monitoring according to example embodiments of the present disclosure.

Referring now to the drawings, wherein the showings are only for the purpose of illustrating the example embodiments only and not for purposes of limiting the same, FIG. 1 illustrates a work vehicle 1 that may be used with the loader usage monitoring apparatus 100 according to example embodiments of the present disclosure. In the embodiment illustrated, the work vehicle 1 is a tractor 2 but it is to be appreciated that the embodiments herein are not limited to use with tractors or use with any particular mobile material handling equipment. For example, the work vehicle 1 may be a tractor with a cab 5. However, the work vehicle may be a tractor without a cab such as for example an open station tractor, or a construction equipment work vehicle such as for example a construction loader. These are merely examples and the embodiments of the monitoring apparatus 100 described herein are adapted for operation in any work vehicle now known or hereinafter developed. The apparatus 100 of the example embodiments herein may execute or otherwise perform a method of monitoring usage of equipment such as loaders and/or of other implements or tools with tractors that carry the equipment, and generating maintenance alert data and signals for alerting an operator of supervisory control that the equipment usage has met maintenance time requirements so that maintenance may be timely performed.

To provide a useful, albeit non-limiting example, the loader usage monitoring apparatus 100 of the example embodiments is described below in conjunction with a particular type of work vehicle 1, shown in the form of a tractor 2, equipped with particular types of work implements 24 such as a pallet fork implement 27, a bucket implement 25, a grapple implement 26, etc. included in an front end loader (FEL) attachment. The following notwithstanding, it is emphasized that embodiments of the loader usage monitoring apparatus 100 may be deployed onboard various other types of work vehicles having one or more movable implements attached thereto. The loader usage monitoring apparatus 100 of the example embodiment shown includes a vision system 120 including for example a vision sensor device 121. The loader usage monitoring apparatus 100 may adjust physically and/or electronically one or more operational characteristics of the one or more imaging and/or perception devices such as the vision system 120 including for example the vision sensor device 121, or other optical and/or imaging device(s) in response to movement of various different types of work implements without limitation. The loader usage monitoring apparatus 100 may be distributed as an integral part of a work vehicle, as an integral part of a loader 10 attachment or other module that may be removably attached to and detached from a work vehicle on an as-needed basis, or as a discrete assembly or multi-component kit that may be installed on an existing work vehicle via retrofit attachment. The vision system 120 is operable in general to generate target device data representative of an image of a set of one or more target devices carried on the loader 10. In an example for tracking usage of the boom separately from the tool carrier, the vision system 120 may further be operable to generate boom target device data representative of an image of a set of one or more boom target devices carried on a boom 20 of the loader 10, and to also generate tool carrier target device data representative of an image of a set of one or more tool carrier target devices carried on a tool carrier 22 of the loader 10.

The vision sensor device 121 may include one or more imaging devices such as for example one or more camera devices operable to generate image data representative of an image of objects and background within the field of view of the one or more cameras. The cameras may be monocular cameras, stereo cameras, and may include for example any one or more devices that use sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more devices that are operable to generate image data representative of an image of objects and background within the field of view of the one or more cameras using Radio Detection and Ranging (RADAR) technologies, for example. The ability to image and generate, by the one or more vision sensor devices 121, image data representative of images of objects within the field of view of the one or more vision sensor devices 121, as well as being representative of images of the background relative to the objects within the field of view is useful for assisting in determining the loader being in use even while loader is in a fixed position relative to the tractor such as for example during a transport mode of operation wherein the loader may be used to support a load elevated relative to the ground while the tractor is traversing a field or other terrain, etc. In that way, the subject loader usage monitoring apparatus 100 may advantageously tally the types of loader usage that may occur even while the loader itself is not being moved.

In some examples, the vision sensor device 121 can be mounted anywhere on the work vehicle 1 and facing forwards toward the bucket, attachment, or other work tool. For example, the camera can be mounted on the front or top surface of a cab 5 of the work vehicle if a cab is provided, or anywhere else on the work vehicle as may be convenient or desired. The vision sensor device 121 can transmit images (or video signals) wirelessly to a display or though wiring that extends along an arm, boom, or other frame structure of the work vehicle to the display. In other examples, the camera can be mounted on an arm of the work vehicle, including the lower surface, upper surface, or sides of the arm structure used to support the bucket, attachment, or other work tool or device used during operation of the work vehicle. Alternatively, the camera can be mounted on a boom of the work vehicle, including the lower surface, upper surface, or sides of the boom that is commonly used to support the arm and is attached to the main body of the work vehicle. Still further the vision sensor device 121 may be mounted to the hood or in an area near the hood and/or anywhere else as may be necessary or desired to obtain suitable complete attachment image views in vehicles of other types such as for example open station tractors, harvesters, construction equipment loaders, etc.

FIG. 1 is a side perspective view of a tractor 2 including a front end loader 10 attachment and a loader usage monitoring apparatus 100, as illustrated in accordance with an example embodiment of the present disclosure. The loader usage monitoring apparatus 100 is only partially shown in FIG. 1 and an example embodiment of which will be described more fully below in conjunction with FIG. 2. First, however, a general description of the tractor 2 is provided to establish an example context in which the loader usage monitoring apparatus 100 may be better understood. In addition to the loader 10 attachment and the vision system 120, the tractor 2 includes a vehicle body 3 having a chassis 4, and a cab 5. It is to be appreciated, however, that the work vehicle 1 may be any type of tractor or without a cab such as for example an open station tractor, or a construction equipment work vehicle such as for example a construction loader. In any cans and in the illustrated example, the example tractor 2 as illustrated generally bilaterally symmetrical about its longitudinal axis, which is parallel to the X-axis identified in FIG. 1 by coordinate legend 6.

In the illustrated embodiment, the work vehicle 1 includes a loader 10 provided for material handling of an associated load. The loader 10 of the work vehicle 1 illustrated includes an articulated boom 20 having a tool carrier 22 on a free end 23 of the boom 20. The tool carrier 22 portion of the loader 10 may be for example a receiver mechanism or other similar device or apparatus provided on the free end 23 of the boom 20 for enabling coupling of an attachment such as an implement or a tool for example with the free end 23 of the boom 20. In this regard, the tool carrier 22 is selectively mutually connectable with one or more various attachments, tools or implements 24 such as for example a bucket implement 25, a grapple implement 26, a pallet fork implement 27 having a set of pallet tines 28, a gripper (not shown), a bail hugger (not shown), a bale spear (not shown), and/or various working devices as may be available and/or desired.

The articulated boom 20 of the loader 10 movably mounts the tool carrier 22 carrying a selected one of the one or more various attachments, tools or implements 24 to a forward portion of the vehicle body 3 and, more specifically, mounts the tool carrier 22 to chassis 4. In the illustrated example, the pallet fork implement 27 is shown attached with the tool carrier 22 but it is to be appreciated that the pallet fork implement 27 may be replaced by any different type of work implement, such as any of the bucket implement 25, the grapple implement 26, the gripper, the bail hugger, the bale spear, all as mentioned above, or any other work implement as necessary and/or desired, in alternative embodiments of the tractor 2. The articulated boom 20 assembly may assume any form capable of moving the work implement 24 relative the vehicle body 4 in response to operator commands. In the example embodiment shown in FIG. 1, the boom assembly 20 includes a system of linkages, hydraulic cylinders, plumbing lines (not shown), and other components suitable for this purpose. More specifically, the boom assembly 20 includes an aft bracket set 30 affixed to the vehicle body 4, a forward bracket set 32 to which the tool carrier 22 carrying the pallet fork implement 27 is pivotally attached, and an intermediate or mid bracket set 34 between the aft and forward bracket sets 30, 32. Twin lift arms 36, 38 pivotally attach the aft bracket set 30 with the mid bracket set 34, which is, in turn, attached with the forward bracket set 32 by twin implement arms 46, 48. Lift cylinders 37, 39 (only one of which can be seen) are further coupled between the aft bracket set 30 and the mid bracket set 34, while bucket cylinders 47, 49 are coupled between the mid bracket set 34 and the forward bracket set 33.

In the example embodiment the vision sensor device 121 is mounted on the cab facing forwards toward the bucket, attachment, or other work tool so that all of the lift arms 36, 38, the implement arms 46, 48, the aft, mid, and forward bracket sets 30, 34, 32, any implements attached with or intended to be attached with the boom, as well as the work area adjacent to the tractor are within the field of view of the vision system 120. Additionally, embodiments the loader usage monitoring apparatus 100 may adjust one or more operational characteristics of one or more imaging devices such as the vision system 120 including for example a vision sensor device 121, or other optical device(s) in response to movement of various different types of work implements without limitation for this purpose. In embodiments of the subject loader usage monitoring apparatus or controller 100 operable with associated work vehicles having a different configuration, the vision sensor device 121 may be mounted at other locations such as on the hood of open station tractors, and on other areas of construction loaders, for example.

The loader 10 attachment further includes other features, such as hydraulic lines and control valves, which are not shown in FIG. 1 for simplicity. When the loader 10 is mounted to the vehicle body 4, the hydraulic lines of the loader 10 are fluidly connected to a pressurized hydraulic fluid supply on the tractor 2 in a manner permitting an operator seated within the cab 5 to control the cylinders 37, 39, 47, and 49. Beginning from a ground position, an operator may command the boom assembly 20 of the loader 10 to lift the tool carrier 22 with and/or without the pallet fork implement 27 or any other implements carried on the tool carrier 22 as shown by controlling the lift cylinders 37, 39 to extend. As the lift cylinders 37, 39 retract, the boom 20 comprising the pallet fork implement 27 when so carried on the tool carrier 22 is lowered from a full height position to a lowered position. In the process of moving from the full height position to the lowered position, the boom 20 travels through the intermediate or mast level position shown in FIG. 1. Similarly, as the bucket cylinders 47, 49 extend in response to operator commands, the boom assembly 20 tilts the pallet fork implement 27 when so carried on the tool carrier 22 from the upright position through an intermediate position to the forward-facing lift position. Conversely, the operator may control the boom assembly 20 to stroke cylinders 37, 38, 47, 48 in a manner opposite to that just described to return the pallet fork implement 27 when so carried on the tool carrier 22 from the grounded, forward-facing lift position to the raised full height position shown in FIG. 3.

It is to be appreciated that the motion of the cylinders 37, 39, 47, and 49 may be controlled directly by operator manipulation of various levers, pedals and/or other human interface device(s) operatively coupled with hydraulic control components of the system, and further that the motion of the loader 10 may be indirectly controlled by the operator rendering motion commands to via the loader usage monitoring apparatus 100 which in turn may operate the various hydraulic control components of the system for moving the cylinders 37, 39, 47, and 49 thereby effecting the desired movement of the loader 10. It is still further to be appreciated that the motion of the cylinders 37, 39, 47, and 49 may be controlled by the loader usage monitoring apparatus 100 automatically and/or semi-automatically in response to generalized operator commands such as for example return to position (RTP) commands wherein for example the loader usage monitoring apparatus 100 may function in an RTP mode to automatically return the boom 20 overall, portions of the boom 20 such as for example the lift arms 36, 38 and/or the implement arms 46, 48, the various attachments, tools or implements 24 when so carried on the tool carrier 22, to one or more pre-stored position(s) in response to operator input. It is to be appreciated that all of the above operations and movements may be performed prior to attaching any of the various work implements 24 with the tool carrier 22.

In the example embodiment shown in the Figures, the empty tool carrier 22 and/or the implements 24 when so carried on the tool carrier 22 are moved by the boom 20 along a vertical plane containing or parallel to the longitudinal axis of the body 4 of the tractor 2 (corresponding to an X-Y plane in coordinate legend 6). The vision system 120 thus need only have a field of view (vertical in the example embodiment) rotatable about a single rotational axis to remain trained on the empty tool carrier 22 and/or on the implements 24 when so carried on the tool carrier 22 throughout the range of motion of the loader 10 relative to the body 4 of the tractor 2. For the vision sensor device 121 shown this rotational axis is parallel to the lateral axis of the tractor 2; a "lateral axis" of the tractor 2 (or other work vehicle) defined as an axis extending within a horizontal plane (an X-Z plane in coordinate legend 6) and perpendicular to the longitudinal axis of the tractor 2. Stated differently, a lateral axis of tractor 2 is parallel to the Z-axis in coordinate legend 6, and the vision sensor device 121 may be selectively rotatable in a further example embodiment about a rotational axis likewise parallel to the Z-axis, although in the example embodiment described herein the vision sensor device 121 remains fixed relative to the work vehicle 1 and in particular relative to the cab 5 of the tractor 2 and, as such remains fixed relative the a rotational axis likewise parallel to the Z-axis. In other embodiments wherein the loader usage monitoring apparatus 100 is deployed onboard a work vehicle including a backhoe or other implement that is rotatable about a horizontal axis (corresponding to the Y-axis in coordinate legend 6), the vision sensor device 121 or other optical device or optical devices included within the loader usage monitoring apparatus 100 may be selectively rotatable about multiple axes including an axis parallel to the horizontal axis.

The vision sensor device 121 or other optical device or devices included with the loader usage monitoring apparatus 100 may also be imparted with additional degrees of freedom in further embodiments. For example, the vision sensor device 121 may be moved to translate along any axis in three dimensional space, as appropriate to better visually capture the pallet fork implement 27 or other implement 24 throughout its full range of motion relative to the body 4 of the tractor 2. For example, and as may be appreciated, the vision sensor device 121 may be mounted on a telescopic post 122 that extends vertically upward when the pallet fork implement 27 or other implement 24 is moved into the full height position to provide a better vantage point for observation of markers on the pallet fork implement 27 or other implement 24 as will be described below to minimize the degree to which the boom assembly 20 visually obstructs the camera's view of the pallet fork implement 27 or other implement 24. In addition, the loader usage monitoring apparatus 100 may electronically adjust one or more operational characteristics of the one or more imaging devices such as the vision system 120 including for example the vision sensor device 121, or other optical device(s) in response to movement of various different types of work implements without limitation to minimize the degree to which the boom assembly 20 visually obstructs the camera's view of the pallet fork implement 27 or other implement 24.

The articulated boom 20 may be maneuvered such as by actuating various hydraulic cylinders 37, 39, 47, 49 to extend or retract and to lower or raise an articulated boom 20 relative to the work vehicle so that the tool carrier 22 may be positioned for coupling the boom 20 with the one or more various implements 24. The tool carrier 22 disposed on the end of the boom 20 collectively forms a loader 10 in accordance with the example embodiments. In an example embodiment herein, the one or more various implements 24 may be initially considered as a workpiece prior to being coupled with the tool carrier 22 of the loader 10 wherein an operator may desire for the one or more various implements 24 and the tool carrier 22 to be mutually latched joined or otherwise mechanically coupled prior to performing a material handling task or the like. As an example, an operator may wish to couple the pallet fork implement 27 with the tool carrier 22 prior to proceeding to approach, lift, and place a palletized load at a desired location.

In accordance with an example embodiment and as will be described in greater detail below, the loader usage monitoring apparatus 100 provides assistance to an operator with regard to monitoring the usage of the loader so that maintenance may be performed in a timely manner and based on the monitored actual physical usage of the loader in the performance of various work functions.

In accordance with an example embodiment, the loader usage monitoring apparatus 100 includes a loader monitoring control apparatus 110, a vision system 120 such as a vision sensor device 121 mounted on the associated work vehicle 1 and operatively coupled with the loader monitoring control apparatus 110, and a display unit 130 operatively coupled with the loader monitoring control apparatus 110. As appearing herein, the term "image sensor device" refers to an optical device, a camera system, electrical light, or other device that generates and/or detects visible and/or invisible light or other electromagnetic radiation. The vision sensor device 121 may include one or more cameras operable to generate image data representative of an image of objects and background within the field of view of the one or more cameras. The cameras may be monocular cameras, stereo cameras, and may include for example devices that use optical sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more cameras operable to generate image data representative of an image of objects and background within the field of view of the one or more cameras using Radio Detection and Ranging (RADAR) technologies, for example. The loader monitoring control apparatus 110 includes a processor device 204 (FIG. 2) and a non-transient memory device 210 (FIG. 2) operatively coupled with the processor device 204 in a manner to be described in greater detail below. The memory device 210 stores loader monitoring logic 211 (FIG. 2) executable by the processor device 204 to determine, based on target device data representative of the image of a set of one or more target devices carried on the loader 10, a current loader movement of the loader from a first loader pose to a second loader pose, generate based on determining the current loader movement and a clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. The display unit 130 is operable to display on a screen 132 thereof, based on the generated loader maintenance alert data, a loader maintenance alert image viewable by the operator of the associated tractor 2 and comprising loader maintenance notification information to alert the operator of required loader maintenance.

In accordance with an example embodiment, the non-transient memory device 210 may store a database 213 storing a plurality of sets of query response data representative of detailed information relating to a plurality of loader maintenance instruction sets. The processor device 204 is operable to execute the loader monitoring logic 211 to retrieve a first set of query response data from the memory device based on a received query signal and the generated loader maintenance alert data. The display unit 130 is operable to display on the screen 132 based on the retrieved first set of query response data one or more loader maintenance instructional images viewable by the operator of the associated tractor 2 and including detailed instructions for use by the operator in effecting the required loader maintenance.

The display unit 130 can be positioned so as to be viewable by the operator while the operator manipulates the work vehicle's controls to perform a task, and so as not to hinder the opening or closing of any latches, hatches, windows, or doors in the cab. In some examples, the display unit 130 can be an existing monitor in the work vehicle that typically shows other information, such as operating parameters (e.g., engine speed, fuel level, and engine temperature) of the work vehicle. In such an example, the monitor may be modified to perform the functionality of the display unit 130.

It is to be appreciated that although only a single vision sensor device 121 is shown for ease of illustration mounted to the work vehicle 1 at the position shown, the vision sensor device 121 shown is merely representative of a set of one or more imaging devices or the like that may include several connected imaging devices that can be mounted on or near the vehicle or anywhere as may be necessary or desired such as for example on other areas of the work vehicle or on portions of the loader itself in order to obtain as many images of the loader and/or on the tool carrier as may be necessary and/or desired for providing images of the loader and/or tool carrier over the full relevant range of movement or motion of the loader and/or tool carrier. The vision sensor device 121 may include one or more camera devices that may be operatively connected and physically mounted on or near the vehicle or anywhere as may be necessary or desired such as for example on other areas of the work vehicle or on portions of the loader itself in order to obtain as many images of the loader and/or on the tool carrier as may be necessary and/or desired for providing images of the loader and/or tool carrier over the full relevant range of movement or motion of the loader and/or tool carrier.

Figure 2:
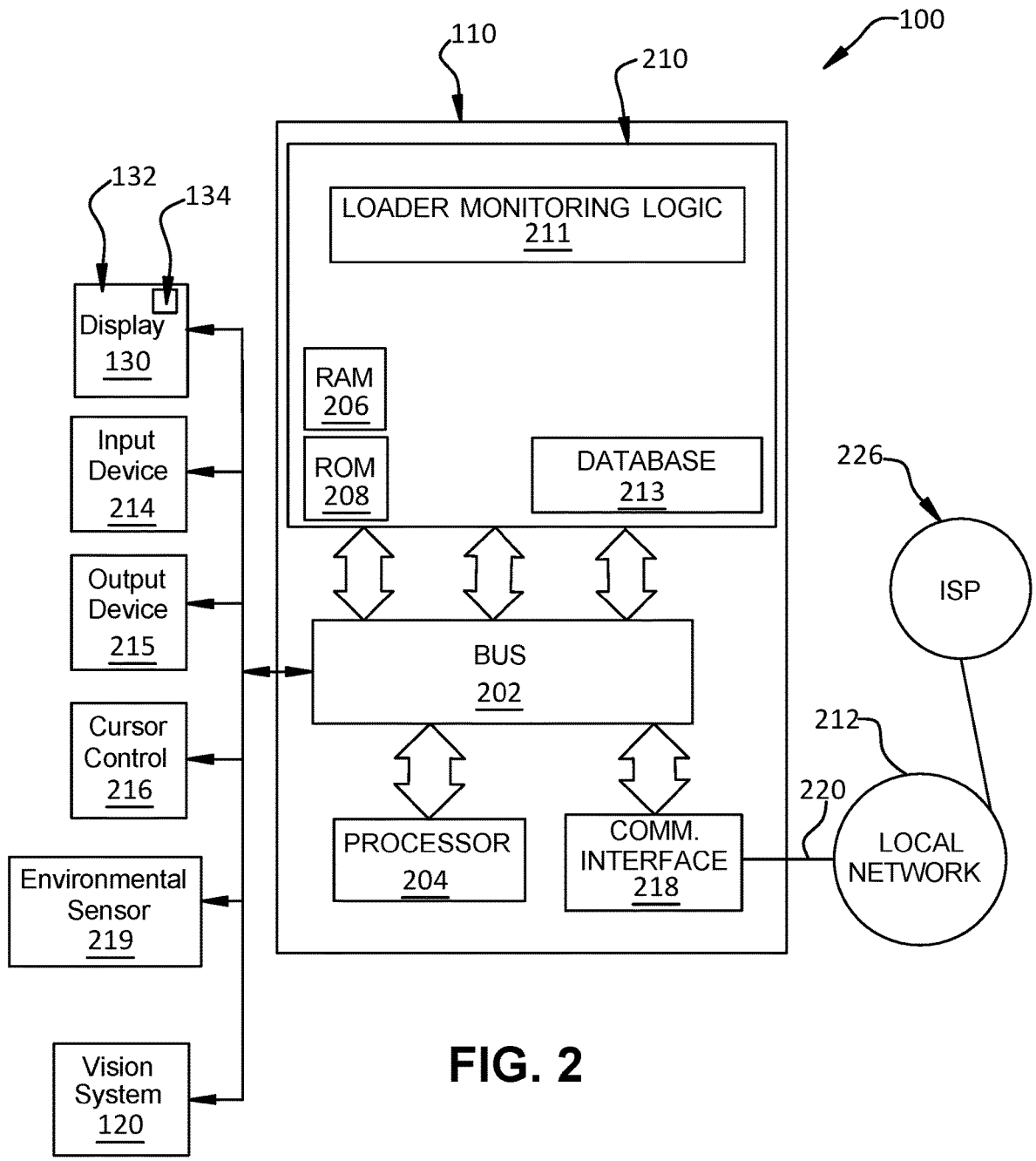
FIG. 2 is a hardware block diagram that illustrates a representative loader usage monitoring apparatus according to the example embodiments.

FIG. 2 is a block diagram that illustrates a representative loader usage monitoring apparatus 100 according to the example embodiments. The loader usage monitoring apparatus 100 is suitable for executing embodiments of one or more software systems or logic modules that perform a method of monitoring usage of the loader and/or tool carrier for assisting an operator of an associated work vehicle by loader maintenance alert images that are viewable by the operator of the associated tractor 2 and that include loader maintenance notification information to alert the operator of required loader maintenance.

The representative loader usage monitoring apparatus 100 according to the example embodiments comprises a loader monitoring control apparatus 110 that includes a bus 202 or other communication mechanism for communicating information, and a processor device 204 coupled with the bus for processing information. The loader monitoring control apparatus 110 further includes a main non-transitory memory device 210 that may comprise one or more memory portions or components or collection of other devices such as random access memory (RAM) 206 or other dynamic storage device for storing information and instructions to be executed by the processor device 204, and read only memory (ROM) 208 or other static storage device for storing static information and instructions for the processor device 204. The memory device 210 is also suitably provided for storing the loader monitoring logic 211 comprising instructions for execution by the processor, and other information including for example data and instructions for execution by the processor for obtaining and displaying loader maintenance alert images and messages on the screen 132 of the display unit 130 that is viewable from an operator's seat of the associated work vehicle 1. The displaying loader maintenance alert images and messages are displayed for helping the user in operating the loader to determine whether to cease operation for performing maintenance or for determining the the maintenance will be required in the near future wherein the work operations may continue, but should be followed with the indicated maintenance at a designated suggested time. The displayed loader maintenance alert images and messages are also helpful to the user by providing instructions to the user with regard to the specific maintenance to be performed, and instructions on processes to be taken in order to effect the specific required maintenance operation. The displayed instructions may include illustrations or images of mechanical structures that would be useful for the operator to better understand the maintenance task relative to the actual physical equipment attached to the tractor.

The memory device 210 may further store aggregated time duration data representative of an aggregated time duration of the one or more previously determined loader movements. In this way, an "hour meter" may be provided to the operator such as for example by presentation of the aggregated time duration as a suitable image on the screen 132 of the display unit 130. In addition, the memory device 210 may further store predetermined loader maintenance time threshold data representative of a predetermined loader maintenance time threshold for performing one or more maintenance activities on the loader. In an example, the processor device 204 is operable to execute the loader monitoring logic 211 to generate loader maintenance alert data based on a sum of a first determined time duration of a current loader movement and an aggregated time duration of one or more previously determined loader movements of the loader exceeding the predetermined loader maintenance time threshold that is stored as predetermined loader maintenance time threshold data in the memory device 210.

The example embodiments described herein are related to the loader usage monitoring apparatus or controller 100 performing a method of monitoring loader usage that assists an operator of an associated work vehicle to perform work with the loader while also alerting the operator of possible maintenance requirements that might help to keep the loader in good working order.

According to one implementation, information for the loader maintenance alerts to be displayed on the screen of the display unit are provided by the loader usage monitoring apparatus or controller 100 in response to the processor device 204 executing the loader monitoring logic 211 comprising one or more sequences of instructions of logic modules contained in main memory 206. Such instructions may be read into main memory 206 from another computer-readable medium, such as storage device 210. Execution of the sequences of the loader monitoring logic 211 instructions contained in storage device 210 and/or main memory 206 causes the processor device 204 to perform the process steps described herein. In an alternative implementation, hard-wired circuitry may be used in place of or in combination with software instructions to implement the example embodiments. Thus implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing loader monitoring logic 211 instructions to the processor device 204 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The loader usage monitoring apparatus or controller 100 further includes a communication interface 218 coupled with the bus 202 which provides a two-way data communication coupling to a network link 220 that is connected to local network 212 such as for example a local network of the work vehicle 1 such as a Controller Area Network (CAN) bus or the like. The communication interface 218 may be a controller area network (CAN) card to provide a data communication connection to a compatible CAN bus. As another example, communication interface 218 may be a local area network (LAN) card to provide a data communication connection to a compatible LAN. For example, communication interface 218 may be an integrated services digital network (ISDN) card or a modem to provide a data communication connection to a corresponding type of telephone line. Wireless links may also be implemented. In any such implementation, communication interface 218 may be a wireless receiver/transmitter, i.e. a transceiver operable to send and receive electrical, electromagnetic, radio frequency (RF), and/or optical signals that carry data streams such as digital data streams representing various types of information.

Network link 220 typically provides data communication through one or more networks to other data devices. For example, network link 220 may provide a connection through a local network to a diagnostic host computer (not shown) of the like for supporting configuration of the system as desired or necessary. An Internet Service Provider (ISP) 226 may provide data communication services indirectly through the Internet via the network 212 or directly through the network link 220.

The example loader usage monitoring apparatus or controller 100 can send messages and receive data, including program code, through the network(s), network link 220 and communication interface 218. In an Internet-connected example embodiment, the loader usage monitoring apparatus or controller 100 is operatively connected with a plurality of external public, private, governmental or commercial servers (not shown) configured to execute a web application in accordance with example embodiments. The example loader usage monitoring apparatus or controller 100 suitably includes several subsystems or modules to perform the virtual operator's guidance as set forth herein. One benefit of the subject application is to provide the operator with information regarding the operating time of equipment such as a loader attached with a work vehicle including aggregated usage time and also to provide the operator with maintenance alert information. A further benefit of the subject application is to provide the operator with such information, wherein the equipment is monitored by devices that are supported by the work vehicle, rather than by the equipment attachments themselves. In that way, the monitoring apparatus may be operated regardless of the type of equipment that is attached and the equipment need not have any specialized electronics or the like carried thereon other than one or more target devices carried on the loader 10.

An output device 215 may also be provided such as in the form of a sound generating device such as a speaker to help improve equipment monitoring by generating audible warnings, alerts, and/or instructions in the form of audible instructions and/or suitable instructional noises such as beeps, voice messages or the like that can be heard from an operator's seat of the associated work vehicle for helping the operator to be alerted to loader maintenance alert data that might be generated. An operator input device 214 may be used to receive a query signal from the operator of the associated tractor 2 for querying the apparatus 100 to display additional messages related to the displayed maintenance alert. The memory device 210 includes a database 213 storing a plurality of sets of query response data representative of detailed information relating to a plurality of loader maintenance instruction sets. The processor device 204 is operable to execute the loader monitoring logic 211 to retrieve a first set of query response data from the memory device based on the received query signal and the generated loader maintenance alert data, and the display unit 130 is operable to display on the screen 132, based on the retrieved first set of query response data, one or more loader maintenance instructional images viewable by the operator of the associated tractor 2 and including detailed instructions for use by the operator in effecting the required loader maintenance. In an example embodiment the operator input device 214 may include a touchscreen portion 134 of the display unit 130, a pointer device 216 operatively coupled with the loader monitoring control apparatus, or any other device or means of communicating training and other information to the control unit 110 of the loader usage monitoring apparatus 100.

In addition to the above, an operation environment sensor 219 is provided. The operation environment sensor 219 is operatively coupled with the loader monitoring control apparatus 110 and is configured to generate an operation environment condition signal representative of an operation environment condition of the loader 10. The operation environment sensor 219 may be a load sensor for example configured to generate an operation environment condition signal comprising a load signal representative of the weight of the loads being manipulated by the loader 10 using the attachments on the tool carrier. For example, the operation environment sensor 219 may be a pressure sensor for sensing a hydraulic fluid pressure for determining the weight of the loads being manipulated by the loader.

The operation environment sensor 219 may also comprise loader position sensor for example configured to generate an operation environment condition signal comprising a loader position signal representative of a position of the loader such as for example during use of the loader in manipulating loads by the loader 10 using the attachments on the tool carrier.

The maintenance alert message may be accelerated in an example embodiment when the loader is used with heavy loads relative to loads within a normal operating weight range. The maintenance alert message may be retarded in an example embodiment when the loader is used with very light loads relative to loads within a normal operating weight range.

In a further example embodiment, the operation environment sensor 219 may be a moisture sensor for example configured to generate an operation environment condition signal comprising a moisture signal representative of the loads being manipulated by the loader 10 in a wet environment. The maintenance alert message may be accelerated in an example embodiment when the loader is used in wet and/or rainy environments relative to a normal moisture operating range. The maintenance alert message may be retarded in an example embodiment when the loader is used in dry and cool environments relative to the normal temperature and moisture operating range.

In a further example embodiment, the operation environment sensor 219 may be a temperature sensor for example configured to generate an operation environment condition signal comprising a temperature signal representative of the loads being manipulated by the loader 10 in a hot or cool environment. The maintenance alert message may be accelerated in an example embodiment when the loader is used in high heat environments relative to a normal temperature operating range. The maintenance alert message may be retarded in an example embodiment when the loader is used in cool environments relative to the normal temperature operating range.

In a further example embodiment, the operation environment sensor 219 may comprise a plurality of sensors that are configured to generate operation environment condition signals comprising for example moisture and temperature signals representative of the loads being manipulated by the loader 10 in a warm and wet environment. The maintenance alert message may be accelerated in an example embodiment when the loader is used in wet and hot environments relative to the normal temperature and moisture operating range. The maintenance alert message may be retarded in an example embodiment when the loader is used in dry and cool environments relative to the normal temperature and moisture operating range.

In a further example embodiment, the operation environment condition signal representative of an operation environment condition of the loader 10 may be received by other means and/or in other ways. For example, the operator input device 214 that may include a touchscreen portion 134 of the display unit 130, a pointer device 216 operatively coupled with the loader monitoring control apparatus 110, or any other device or means of communicating training and other information to the loader monitoring control apparatus 110 may be used by the system to receive from the operator the operation environment condition signal representative of the operation environment condition of the loader 10. In that way, the system may receive operation environment condition signals from the operator that might not be easily deduced or otherwise interpreted by traditional physical sensors. By way of example, the system may receive from the operator via the operator input device 214 operation environment condition signal comprising environmental condition data representative of the load being handled by the loader as being particularly corrosive such as loads comprising salt or the like.

In an example embodiment, the processor device 204 is operable to execute the loader monitoring logic 211 to generate work environment sensitive loader maintenance alert data based on a sum of: i) a product of environmental condition data representative of the operation environment condition signal and the first time duration of the current loader movement; and ii) the aggregated time duration of the one or more previously determined loader movements of the loader exceeding the predetermined loader maintenance time threshold. The display unit 130 is operable to display on the screen 132, based on the generated work environment sensitive loader maintenance alert data, a work environment sensitive loader maintenance alert image viewable by the operator of the associated tractor 2 and comprising loader maintenance notification information to alert the operator of required loader maintenance.

In a further example embodiment, the operation environment sensor 219 is operable to sense operation of the loader that includes movement of the loader and generate loader movement data representative of the sensed loader movement. In accordance with an aspect herein, an embodiment herein is directed to methods and systems that automatically monitor one or more machine usage factors such as a usage time of a loader attachment on a work vehicle based on signals received from one or more operation environment sensors such as acoustic sensors. The one or more operation environment sensors may be acoustic sensors or the like configured to sense chirping or other noise generated by movement of any one or more components or portions of the loader. In accordance with an aspect herein, an apparatus is provided for monitoring operation of a loader carried on an associated tractor. The apparatus includes an operation environment sensor, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The operation environment sensor is operable to sense operation of the loader that includes movement of the loader and generate loader movement data representative of the sensed loader movement. The display unit includes a screen that is viewable by an operator of the associated tractor. In accordance with the aspect, the processor device is operable to execute the loader monitoring logic to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

Figure 3:
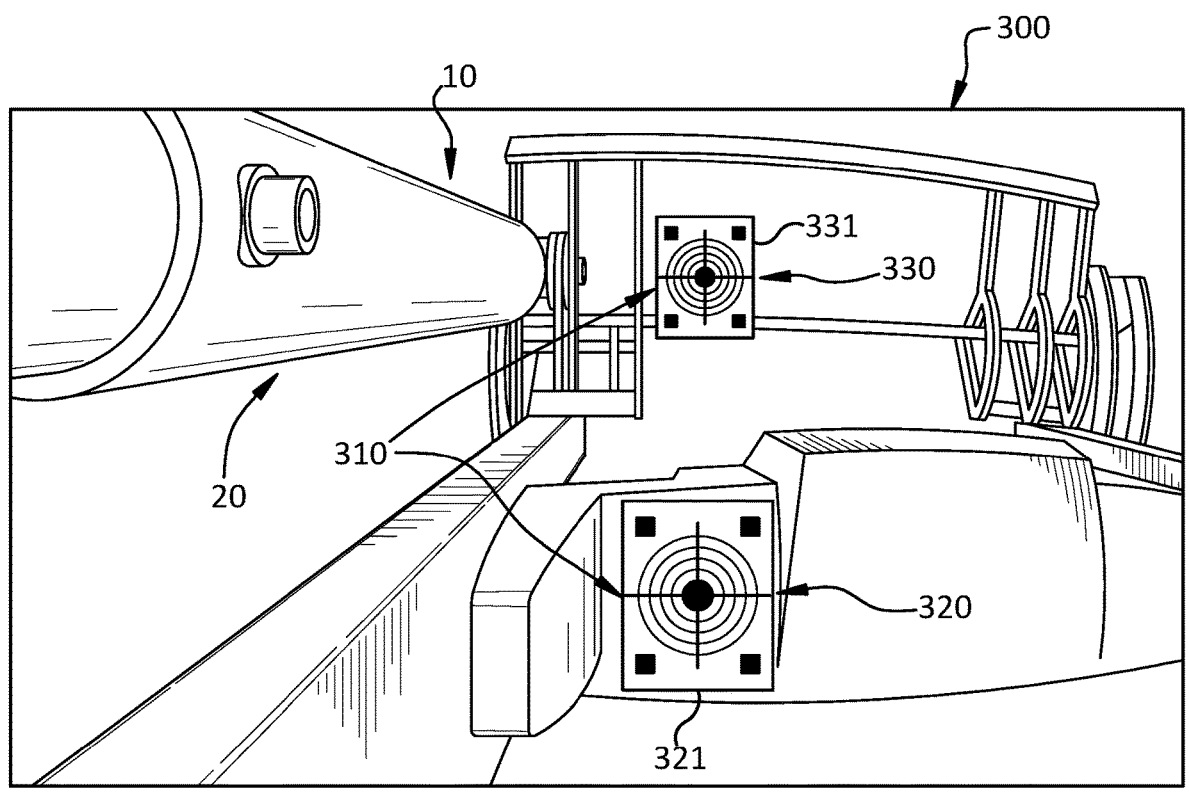
FIG. 3 is a diagram showing an image of equipment obtained by a vision system in accordance with an example embodiment.

An embodiment herein is directed to methods and systems that automatically monitor usage time of a loader attachment on a work vehicle that tallies the usage time whenever any one or more portions or segments of a loader carried on a tractor is/are moved relative to the tractor and/or relative to each other. In this regard, FIG. 3 is a diagram showing an image 300 of equipment obtained by a vision system 120 in accordance with an example embodiment. As described, the vision system 120 is operable to image a set of one or more target devices 310 carried on the loader 10 to generate target device data representative of the image 300 of the set of one or more target devices 310. In accordance with an example embodiment, the processor device 204 is operable to execute the loader monitoring logic 211 to determine the current loader movement by determining the first loader pose of the loader 10 based on first target device data representative of an image of the set of one or more target devices generated by the vision system 120 at a first time, determining the second loader pose of the loader 10 based on second target device data representative of an image of the set of one or more target devices generated by the vision system 120 at a second time after the first time, and determining the current loader movement of the loader 10 between the first and second times based on a difference in a comparison between the determined first and second loader poses.

In accordance with an example embodiment, the vision system 120 is operable to image a set of one or more boom target devices 320 carried on the boom 20 of the loader 10 to generate boom target device data representative of the image of the set of one or more boom target devices 320. In addition and in accordance with an example embodiment, the vision system 120 is operable to image a set of one or more tool carrier target devices 330 carried on the tool carrier 22 of the loader 10 to generate tool carrier target device data representative of the image of the set of one or more tool carrier target devices 320.

In accordance with an example embodiment and overall, the set of one or more target devices 310 including the set of one or more boom target devices 320 and the set of one or more tool carrier target devices 330 are physical target devices having one or more physical properties that lend themselves for determination by the loader usage monitoring apparatus 100 based on the obtained images thereof of a pose, inclination, orientation, or the like of the physical target devices 320, 330 relative to the vision system 120 and, hence, also of the pose, inclination, orientation, or the like of the boom and/or of the tool carrier relative to the work vehicle and/or relative to the ground beneath the vehicle owing to a mounting of the physical boom and tool carrier target devices 320, 330 on the boom and tool carrier at predetermined positions of the boom and tool carrier target devices on the boom and tool carrier respectively, and the relative positions thereof and the vision system 120. Physical target devices having such one or more physical properties that lend themselves for determination by the loader usage monitoring apparatus 100 based on the obtained image of a pose, inclination, orientation, or the like of the physical target devices may include for example signage carrying positional indicia at predefined locations on the signage wherein examples include bar codes, Quick Response (QR) codes having position patterns at the corners of the QR code label, markers, or the like. Manufacturer's logos, or the like may also be provided on or at the boom and/or on or at the tool carrier on the end of the boom for imaging by the vision system 120 to determine from the obtained image a pose, inclination, orientation, or the like of the boom and/or of the tool carrier relative to the work vehicle and/or relative to the ground beneath the vehicle owing to a mounting of the physical boom target device in the example form of a manufacturer's logo or the like on the boom at a predetermined relative position between the target device and the boom and/or on the tool carrier at a predetermined relative position between the target device and the tool carrier. In the example embodiment illustrated, the boom and tool carrier target devices 320, 330 are devices 321, 331 carrying bulls eye type target information thereon.

The processor device 204 is operable to execute the loader monitoring logic 211 to determine, based on the boom target device data, a current boom movement of the boom from a first boom pose to a second boom pose.

The processor device 204 is also operable to execute the loader monitoring logic 211 to further determine, based on the tool carrier target device data, a current tool carrier movement of the tool carrier from a first tool carrier pose to a second tool carrier pose.

The processor device 204 is further operable to execute the loader monitoring logic 211 to generate based on determining the current boom movement and the clock signal first boom usage time data representative of a first time duration of the current boom movement, and/or to generate based on determining the current tool carrier movement and the clock signal first tool carrier usage time data representative of a first time duration of the current tool carrier movement.

Loader maintenance alert data may be generated based on a sum of: i) the first time duration of the current boom movement; and ii) an aggregated time duration of one or more previously determined loader movements of the boom exceeding a predetermined boom maintenance time threshold.

Loader maintenance alert data may also be generated based on a sum of: i) the first time duration of the current tool carrier movement; and ii) an aggregated time duration of one or more previously determined tool carrier movements of the tool carrier exceeding a predetermined carrier maintenance time threshold.

In this way, the methods and systems herein may automatically monitor one or more machine usage factors such as a usage time of a boom portion of loader attachment separately from a usage time of a tool carrier portion of the loader. This is useful for example for providing more accurate and detailed time usage information so that the appropriate equipment specific maintenance may be performed such as for example tool carrier maintenance or loader/boom maintenance.

An embodiment herein is directed to methods and systems that automatically monitor usage time of a loader attachment on a work vehicle that tallies the usage time whenever any one or more portions or segments of a loader carried on a tractor is/are moved relative to the tractor and/or relative to each other. In this regard, signals received from the operation environment sensor 219 may be used in place of and/or together with the signals received from the vision system 120 to determine the loader usage. The operation environment sensor 219 may be an acoustic sensor, for example.

In accordance with an aspect herein, an apparatus is provided for monitoring operation of a loader carried on an associated tractor. The apparatus includes an operation environment sensor, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The operation environment sensor is operable to sense operation of the loader that includes movement of the loader and generate loader movement data representative of the sensed loader movement. The display unit includes a screen that is viewable by an operator of the associated tractor. In accordance with the aspect, the processor device is operable to execute the loader monitoring logic to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance. In accordance with the aspect, the one or more operation environment sensors may be acoustic sensors configured to sense chirping or other noise generated by movement of any one or more components or portions of the loader.

In accordance with an aspect herein, a method of monitoring operation of a loader carried on an associated tractor is provided. An operation environment sensor is operable to sense operation of the loader that includes movement of the loader and generate loader movement data representative of the sensed loader movement. The loader movement data and loader monitoring logic are stored in a non-transient memory device of a loader monitoring control apparatus operatively coupled with the vision system and comprising a processor device operatively coupled with the memory device. A clock circuit operatively coupled with the processor device generates a clock signal representative of a current time. The loader monitoring logic is executed by the processor device to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. A loader maintenance alert image is displayed on a screen of a display unit operatively coupled with the loader monitoring control apparatus and viewable by the operator based on the generated loader maintenance alert data, wherein the loader maintenance alert image includes loader maintenance notification information to alert the operator of required loader maintenance. In accordance with the aspect, the one or more operation environment sensors may be acoustic sensors configured to sense chirping or other noise generated by movement of any one or more components or portions of the loader.

In accordance with an aspect herein, an apparatus is provided for monitoring operation of a loader carried on an associated tractor. The apparatus includes an operation environment sensor, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The operation environment sensor is operable to sense operation of the loader that includes movement of the loader and generate loader movement data representative of the sensed loader movement. The display unit includes a screen that is viewable by an operator of the associated tractor. In accordance with the aspect, the processor device is operable to execute the loader monitoring logic to determine based on the loader movement data a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance. In accordance with the aspect, the one or more operation environment sensors may be acoustic sensors configured to sense chirping or other noise generated by movement of any one or more components or portions of the loader.

An embodiment herein is directed to methods and systems that automatically monitor usage time of a loader attachment on a work vehicle that tallies the usage time whenever the tractor is moving even though any of the one or more portions or segments of a loader carried on a tractor are held in fixed positions relative to the tractor and/or relative to each other. Loader usage may also be tallied and/or otherwise accounted for and accumulated in an example embodiment in a transport mode of tractor/loader operation wherein the tractor may be driving or otherwise moving from place to place carrying a load using the loader and without loader movement. In this regard, an embodiment herein is directed to methods and systems that automatically monitor usage time of a loader attachment on a work vehicle that tallies the usage time whenever the tractor is moving even though any of the one or more portions or segments of a loader carried on a tractor are held in fixed positions relative to the tractor and/or relative to each other. In the example embodiment, the vision system obtains data representative of the area around the tractor that is used to determine that the tractor is moving, even though the loader may remain in a fixed position relative to the tractor.

In accordance with an aspect herein, an apparatus is provided for monitoring operation of a loader carried on an associated tractor. The apparatus includes a vision system, a loader monitoring control apparatus operatively coupled with the vision system, and a display unit operatively coupled with the loader monitoring control apparatus. The loader monitoring control apparatus includes a processor device, a non-transient memory device operatively coupled with the processor device and storing the target device data, a clock circuit operatively coupled with the processor device and generating a clock signal representative of a current time, and loader monitoring logic stored in the memory device. The vision system 120 is operable to image an area surrounding the tractor carrying the loader to generate tractor movement data representative of the tractor driving or otherwise moving. The vision system 120 is operable alone or in combination with the loader monitoring logic being executed to determine that the tractor carrying the loader is driving or otherwise moving by determining one or more changes in camera view such as for example as might occur when the tractor tilts slightly under acceleration or as it moves in general. In addition, a loader identification and/or confirmation signal is received from the operator via the operator input device 214 that indicates that a loader is attached with the tractor. In further addition, signals from other vehicle sensors are useful to determine that the tractor is moving such as for example signals from one or more of a vehicle speed sensor, an inertial sensor, an accelerometer, a velocity sensor, a global position sensor (GPS), rotational speed sensors on the tractor axles, inertial measurement units (IMUs), or the like.

In accordance with the aspect, the processor device is operable to execute the loader monitoring logic to determine a current use of the loader based on the tractor movement data together with confirmation from one or more of the loader identification and/or confirmation signal received from the operator and/or one or more of the movement signals received from one or more of the sensors identified above, generate based on determining the loader use and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

In accordance with an aspect herein, a method of monitoring operation of a loader carried on an associated tractor is provided. A vision system is operable to image an area surrounding the tractor carrying the loader to generate tractor movement data representative of the tractor driving or otherwise moving. Loader monitoring logic is stored in a non-transient memory device of a loader monitoring control apparatus operatively coupled with the vision system and comprising a processor device operatively coupled with the memory device. A clock circuit operatively coupled with the processor device generates a clock signal representative of a current time. The loader monitoring logic is executed by the processor device to determine based on the tractor movement data together with the confirmation from the one or more of the loader identification and/or confirmation signal received from the operator and/or one or more of the movement signals received from one or more of the sensors identified above, a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. A loader maintenance alert image is displayed on a screen of a display unit operatively coupled with the loader monitoring control apparatus and viewable by the operator based on the generated loader maintenance alert data, wherein the loader maintenance alert image includes loader maintenance notification information to alert the operator of required loader maintenance.

In accordance with an aspect herein, an apparatus is provided for monitoring operation of a loader carried on an associated tractor. The apparatus includes a vision system, a loader monitoring control apparatus operatively coupled with the vision system, and a display unit operatively coupled with the loader monitoring control apparatus. The loader monitoring control apparatus includes a processor device, a non-transient memory device operatively coupled with the processor device, a clock circuit operatively coupled with the processor device and generating a clock signal representative of a current time, and loader monitoring logic stored in the memory device. The vision system is operable to image an area surrounding the tractor carrying the loader to generate tractor movement data representative of the tractor driving or otherwise moving. The display unit includes a screen that is viewable by an operator of the associated tractor. In accordance with the aspect, the processor device is operable to execute the loader monitoring logic to determine based on the tractor movement data together with the confirmation from the one or more of the loader identification and/or the confirmation signal received from the operator and/or one or more of the movement signals received from the one or more of the sensors identified above, a current loader movement of the loader, generate based on determining the current loader movement and the clock signal first loader usage time data representative of a first time duration of the current loader movement, and generate loader maintenance alert data based on a sum of: i) the first time duration of the current loader movement; and ii) an aggregated time duration of one or more previously determined loader movements of the loader exceeding a predetermined loader maintenance time threshold. In accordance with the aspect, the display unit is operable to display on the screen based on the generated loader maintenance alert data, a loader maintenance alert image viewable by the operator of the associated tractor and comprising loader maintenance notification information to alert the operator of required loader maintenance.

Figure 4:
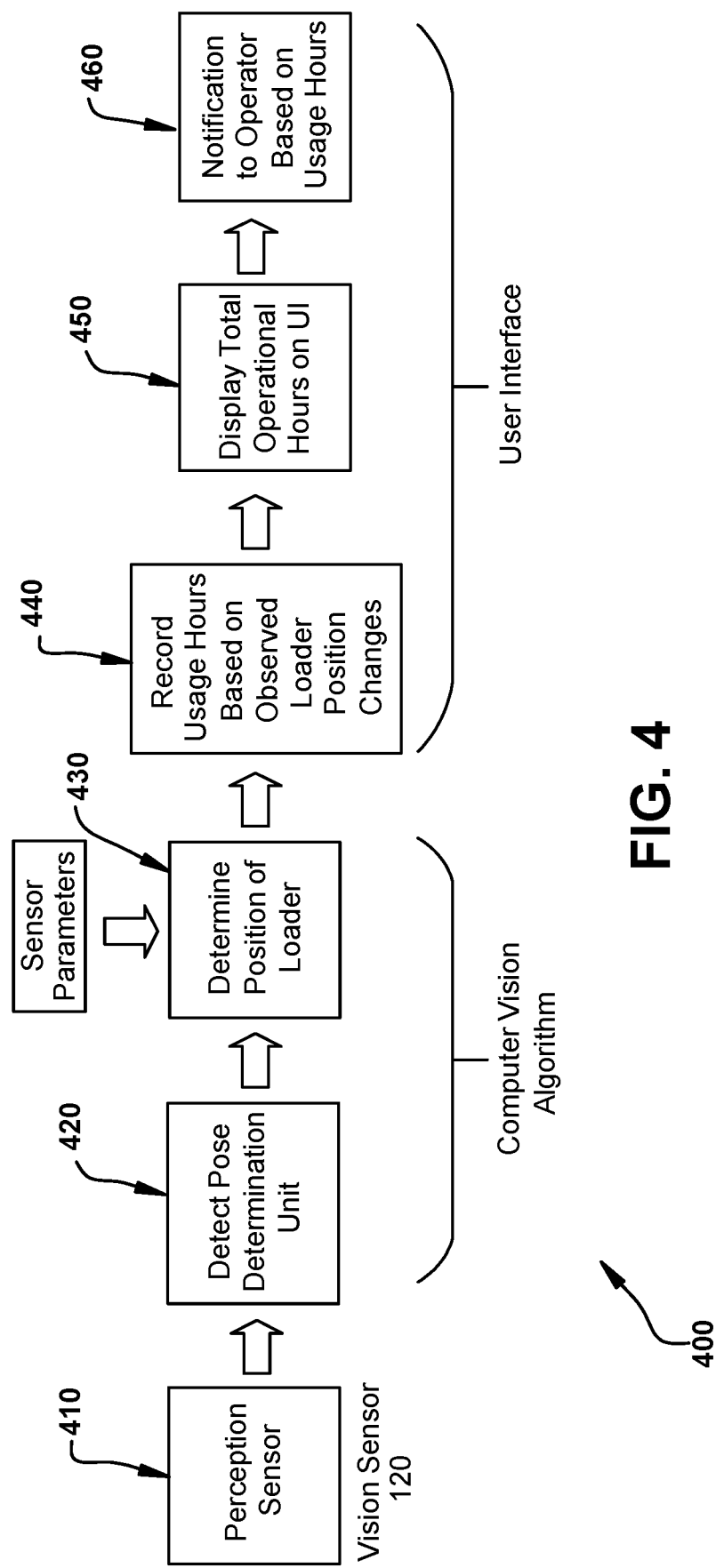
FIG. 4 is a diagram showing a functional flow of the loader usage monitoring apparatus in accordance with an example embodiment.

FIG. 4 is a diagram showing a functional work flow 400 of the loader usage monitoring apparatus 100 in accordance with an example embodiment. Overall, the processor is operable to execute the implement loader monitoring logic 211 stored in the memory device 210 in accordance with an example embodiment to image a set of one or more target devices 310 carried on the loader 10 to determine and display a loader total aggregated usage time image viewable by the operator of the associated tractor 2 and representative of an aggregated quantity of time from a predetermined start time point of the loader moving. In this way, the loader usage monitoring apparatus 100 provides assistance to an operator with regard to an "hour meter" representing aggregated usage of the loader. The loader monitoring logic 211 is also executable to generate loader maintenance alert data based on a first time duration of a current loader movement and an aggregated time duration of one or more previously determined loader movements of the loader exceeding a predetermined loader maintenance time threshold, wherein the generate loader maintenance alert data is displayed on a screen 132 of a display unit 130 as a loader maintenance alert image viewable by the operator of the associated tractor 2. The displayed loader maintenance alert image may include loader maintenance notification information to alert the operator of required loader maintenance. In this way, the loader usage monitoring apparatus 100 provides assistance to an operator with regard to one or more maintenance operations that should be performed on the equipment attached with the tractor.

At 410 an image of the implement is received. In an example embodiment, the image of the implement may be obtained using the vision system 120. In the example illustrated, the vision system 120 operates to generate target device data representative of the image 300 of the set of one or more target devices 310 carried on the loader 10. The target device data may include for example boom target device data representative of an image of a set of one or more boom target devices 320 carried on the boom 20 of the loader 10. The target device data may also include for example tool carrier target device data representative of an image of a set of one or more tool carrier target devices 330 carried on a tool carrier 22 of the loader 10.

At 420 pose determination functionality of the loader monitoring logic 211 is performed. In this regard and in accordance with an example embodiment, the processor device 204 is operable to execute the pose determination functionality of the loader monitoring logic 211 to determine a first loader pose of the loader 10 based on first target device data representative of an image of the set of one or more target devices generated by the vision system 120 at a first time. Similarly, the processor device 204 is operable to execute the pose determination functionality of the loader monitoring logic 211 to determine a second loader pose of the loader 10 based on second target device data representative of an image of the set of one or more target devices generated by the vision system 120 at a second time. The processor device 204 executing the pose determination functionality of the loader monitoring logic 211 may determine loader motion based on differenced in the determined loader poses at the different imaging times.

At 430 position determination functionality of the loader monitoring logic 211 is performed for purposes including to determine whether the loader has moved from another and different position at a previous time. In this regard, the processor device 204 is operable to execute the position determination functionality of the loader monitoring logic 211 to determine the current loader movement by determining the current loader movement of the loader 10 between the first and second times based on a difference in a comparison between the determined first and second loader poses.

At 440 usage time determination functionality of the loader monitoring logic 211 is performed for aggregating usage time of the loader. In this regard and in accordance with an example embodiment, the processor device 204 is operable to execute the usage time determination functionality of the loader monitoring logic 211 to increment, for each determined current loader movement, aggregated time duration data stored in the memory device 204 and representative of the aggregated time duration of the one or more previously determined loader movements.

At 450 hour meter functionality of the loader monitoring logic 211 is performed for displaying on the screen 132 of the display unit 130 a loader total aggregated usage time image viewable by the operator of the associated tractor 2 and representative of an aggregated quantity of time from a predetermined start time point of the loader moving. The aggregated quantity of time from the predetermined start time point of the loader moving may be based for example on the sum of a first time duration of a current loader movement and the aggregated time duration of the one or more previously determined loader movements of the loader.

At 460 maintenance alert functionality of the loader monitoring logic 211 is performed for alerting the operator of the tractor that maintenance may be required. The processor device 204 is operable to execute the maintenance alert functionality of the loader monitoring logic 211 to generate loader maintenance alert data based on a sum of a first time duration of a current loader movement and an aggregated time duration of one or more previously determined loader movements of the loader exceeding a predetermined loader maintenance time threshold. The display unit 130 is operable to display on the screen 132 based on the generated loader maintenance alert data a loader maintenance alert image viewable by the operator of the associated tractor 2 and comprising loader maintenance notification information to alert the operator of required loader maintenance.

Figure 5:
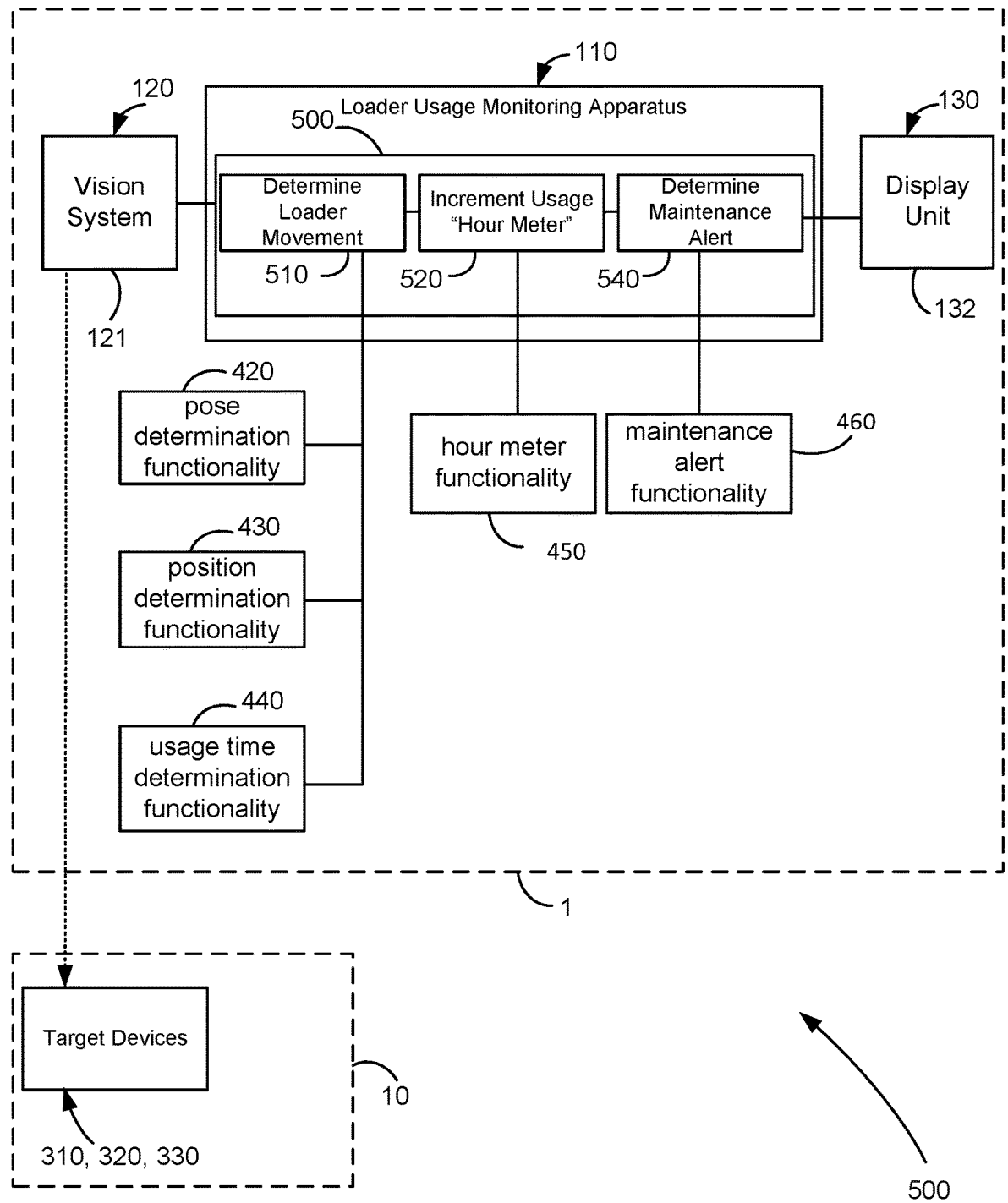
FIG. 5 is a functional block diagram showing the loader usage monitoring apparatus in accordance with an example embodiment.

FIG. 5 is a functional block diagram 500 showing the loader usage monitoring apparatus 100 in accordance with an example embodiment. As shown the loader usage monitoring apparatus 100 includes a loader monitoring control apparatus 110, a vision system 120 in the form in the example of a vision sensor device 121, and a display unit 130 including a screen 132 that is viewable by an operator of the tractor. The vision system 120 is operable to image a set of one or more target devices 310, 320, 330 carried on the loader 10 to generate target device data representative of the image of the set of one or more target devices.

In the example embodiment, the loader usage monitoring apparatus 100 is operable in the functional block 500 to generate information relating to movement of the loader for display on the screen 132 of the display device 130 such as for example a usage or "hour meter," and to generate information relating to maintenance notification information for display on the screen 132 of the display device 130 to alert the operator of required loader maintenance.

In the example embodiment shown in the Figure, the apparatus 100 executes loader monitoring logic 211 stored in the memory device 210 to determine loader movement 510. As described above and in accordance with an example embodiment, the processor device 204 is operable to execute the pose determination functionality of the loader monitoring logic 211 to determine a first loader pose of the loader 10 based on first target device data representative of an image of the set of one or more target devices generated by the vision system 120 at a first time. Similarly, the processor device 204 is operable to execute the pose determination functionality 420 of the loader monitoring logic 211 to determine a second loader pose of the loader 10 based on second target device data representative of an image of the set of one or more target devices generated by the vision system 120 at a second time. The processor device 204 executing the pose determination functionality 420 of the loader monitoring logic 211 may determine loader motion based on differenced in the determined loader poses at the different imaging times.

In addition, position determination functionality 430 of the loader monitoring logic 211 is performed for purposes including to determine whether the loader has moved from another and different position at a previous time. In this regard, the processor device 204 is operable to execute the position determination functionality 430 of the loader monitoring logic 211 to determine the current loader movement by determining the current loader movement of the loader 10 between the first and second times based on a difference in a comparison between the determined first and second loader poses.

In further addition, usage time determination functionality 440 of the loader monitoring logic 211 is performed for aggregating usage time of the loader. In this regard and in accordance with an example embodiment, the processor device 204 is operable to execute the usage time determination functionality 440 of the loader monitoring logic 211 to increment, for each determined current loader movement, aggregated time duration data stored in the memory device 204 and representative of the aggregated time duration of the one or more previously determined loader movements.

Also in the example embodiment shown in the Figure, the apparatus 100 executes hour meter functionality 450 of the loader monitoring logic 211 stored in the memory device

210 to increment usage information for sustaining an "hour meter" 520 for storage in the memory device and for display for observation by the operator. As described above and in accordance with an example embodiment, the processor device 204 is operable to execute the hour meter functionality 450 of the loader monitoring logic 211 to determine a loader total aggregated usage time image viewable by the operator of the associated tractor 2 and representative of an aggregated quantity of time from a predetermined start time point of the loader moving. The aggregated quantity of time from the predetermined start time point of the loader moving may be based for example on the sum of a first time duration of a current loader movement and the aggregated time duration of the one or more previously determined loader movements of the loader.

Also in the example embodiment shown in the Figure, the apparatus 100 executes maintenance alert functionality 460 of the loader monitoring logic 211 stored in the memory device 210 to alert the operator of the tractor that maintenance may be required. The processor device 204 is operable to execute the maintenance alert functionality of the loader monitoring logic 211 to generate loader maintenance alert data based on a sum of a first time duration of a current loader movement and an aggregated time duration of one or more previously determined loader movements of the loader exceeding a predetermined loader maintenance time threshold. The display unit 130 is operable to display on the screen 132 based on the generated loader maintenance alert data a loader maintenance alert image viewable by the operator of the associated tractor 2 and comprising loader maintenance notification information to alert the operator of required loader maintenance.

In the example embodiment shown in the Figure, the display unit 130 is operable to display on the screen 132, based on generated loader maintenance alert data, a loader maintenance alert image viewable by the operator of the associated tractor 2 and comprising loader maintenance notification information to alert the operator of required loader maintenance. The display unit 130 is further operable to display on the screen 132, based on a sum of a first time duration of a current loader movement and an aggregated time duration of the one or more previously determined loader movements of the loader, a loader total aggregated usage time image viewable by the operator of the associated tractor 2 and representative of an aggregated quantity of time as an "hour meter" from a predetermined start time point of the loader moving.

In this way the methods and systems herein assist an operator to visualize and understand information regarding the operating time of equipment such as a loader attached with a work vehicle including aggregated usage time, and also to provide the operator with maintenance alerts and maintenance procedure information.

Figure 6A:
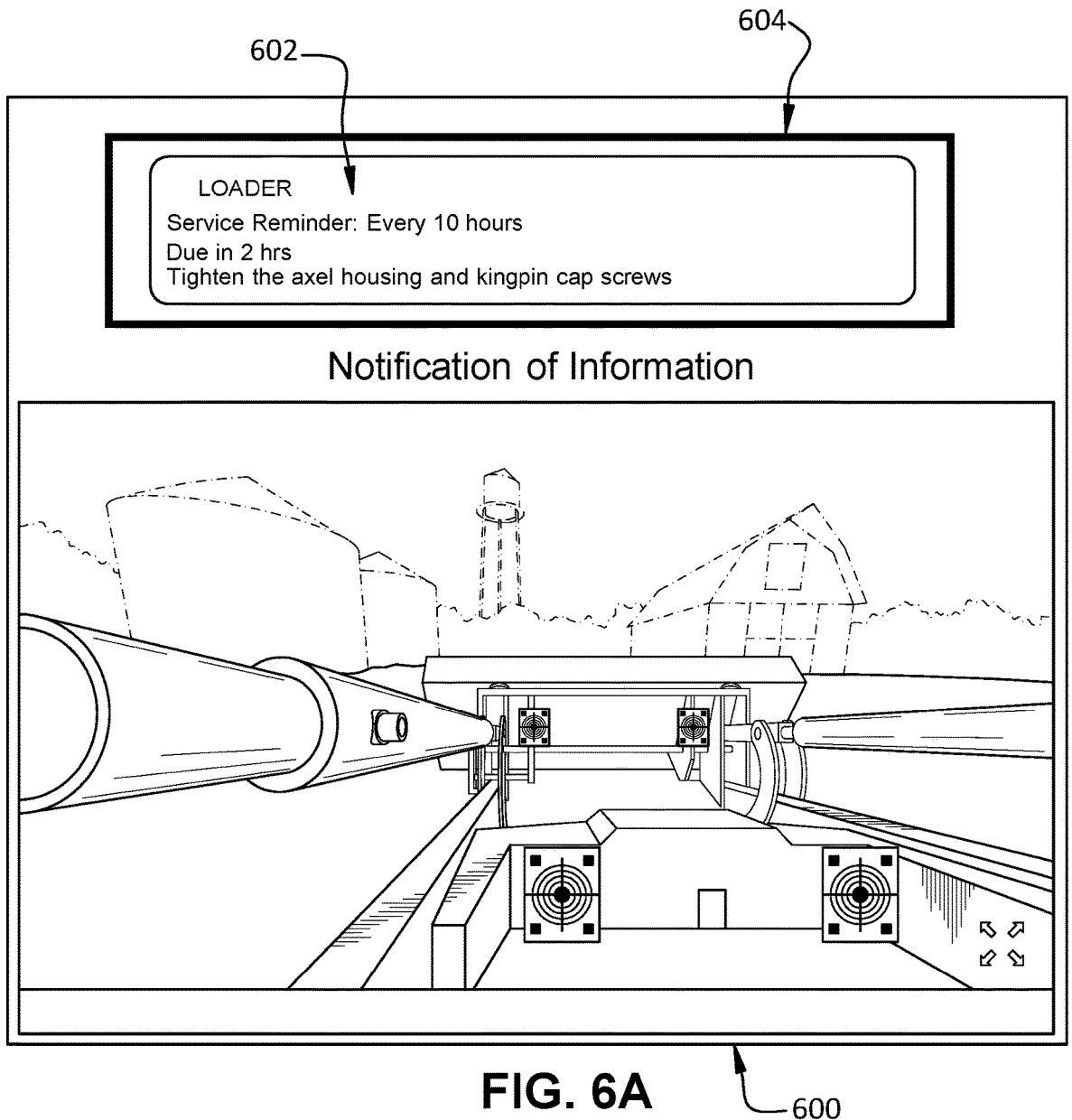
FIG. 6A is an illustration showing a loader maintenance alert image viewable by the operator of the associated tractor in accordance with an example embodiment.

FIG. 6A is an illustration showing a loader maintenance alert image 600 viewable by the operator of the associated tractor in accordance with an example embodiment. As shown there, the image 600 includes a maintenance reminder image 602 containing information relating to a Service Reminder that occurs in predefined intervals (every 10 hours of operation in the example). The maintenance reminder image 602 also contains maintenance countdown information (due in 2 hours in the example) for providing the operator with information indicating a time period remaining that is available for operation of the equipment attached with the tractor. The maintenance reminder image 602 still further contains a brief description of the specific maintenance activity (tighten axle housing and kingpin cap screws in the example) that is subject of the loader maintenance alert.

A described above, the example embodiment of the subject loader usage monitoring apparatus 100 includes an operator input device 214 operatively coupled with the loader monitoring control apparatus 110. The operator input device 214 may be used by the operator to query the apparatus regarding retrieving additional information from the database relating to the maintenance alert message that is displayed. In an example embodiment the operator input device 214 may include a touchscreen portion 134 of the display unit 130, a pointer device 216 operatively coupled with the loader monitoring control apparatus 110, or any other device or means of communicating training and other information to the loader monitoring control apparatus 110.

It is to be appreciated that the messages generated by the apparatus and methods herein need not be strictly related to maintenance of the loader, etc. Rather, the messages may include helpful information for use by the operator for enhancing the work activity using the loader. For example, the maintenance alert messages may relate to loader aftermarket information such as to include suggestions to the operator to purchase additional loader features, related equipment, or the like. This information could include interaction with a virtual store such as for example via the network link 220 that may provide data communication through one or more networks to other data devices. For example, network link 220 may provide a connection through a local network to a host computer (not shown) of the like for supporting configuration of the system as desired or necessary. An Internet Service Provider (ISP) 226 may provide data communication services indirectly through the Internet via the network 212 or directly through the network link 220. This may enable the user to be made aware of the possibility to enable other features of the equipment and/or to order additional features, equipment, services and/or parts or the like. For brevity and ease of discussion, all such helpful informational messages will be referred to herein as "maintenance alert messages," "maintenance alert images" and the like.

Figure 6B:
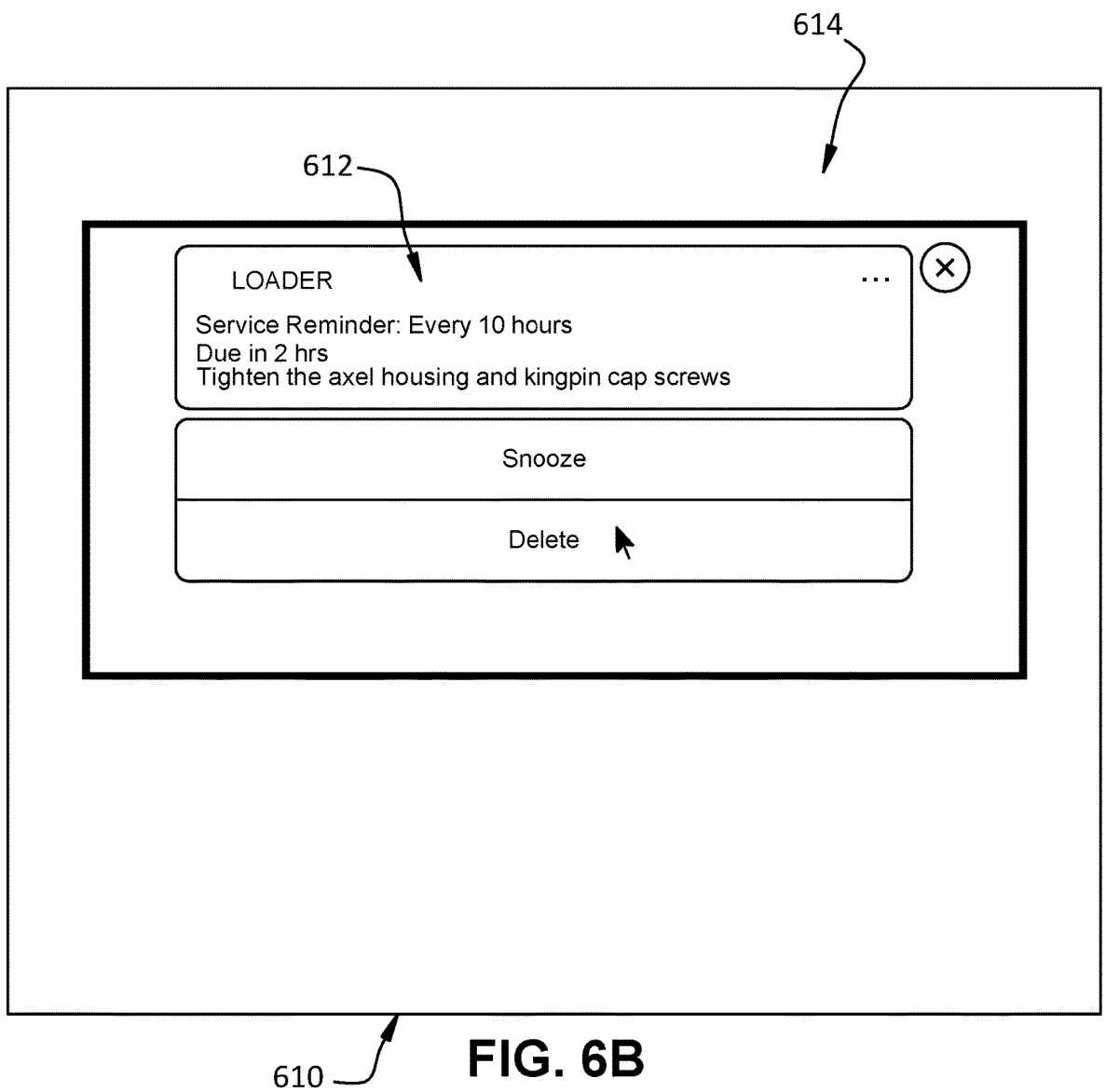
FIG. 6B is an illustration showing a loader maintenance alert image viewable by the operator of the associated tractor that provides further detail in connection with the maintenance alert image of FIG. 6A in accordance with an example embodiment.

In an example embodiment during system use, the operator may select a first virtual maintenance selection indicia 610 portion of the loader maintenance alert image 600 that is displayed on the touchscreen 134 using a pointer, finger, or the like. The loader monitoring control apparatus 110 is responsive to the selection of the first virtual maintenance selection indicia 610 by the operator to generate an expanded view loader maintenance alert image 610 as shown in FIG. 6B. This is convenient for the operator particularly while operating the vehicle wherein the information is presented to the operator in an enlarged or magnified form. As shown there, the expanded view loader maintenance alert image 610 includes a magnified maintenance reminder image 612 containing the information relating to the Service Reminder that occurs in predefined intervals (every 10 hours of operation in the example). The magnified maintenance reminder image 612 also contains maintenance countdown information (due in 2 hours in the example) for providing the operator with information indicating a time period remaining that is available for operation of the equipment attached with the tractor. The magnified maintenance reminder image 612 still further contains a brief description of the specific maintenance activity (tighten axle housing and kingpin cap screws in the example) that is subject of the loader maintenance alert.

In an example embodiment during system use, the operator may select a second virtual maintenance selection indicia 620 portion of the magnified loader maintenance alert image 610 that is displayed on the touchscreen 134 using a pointer, finger, or the like. The loader monitoring control apparatus 110 is responsive to the selection of the second virtual maintenance selection indicia 620 by the operator to generate a maintenance history image 620 as shown in FIG. 6C.

Figure 6C:
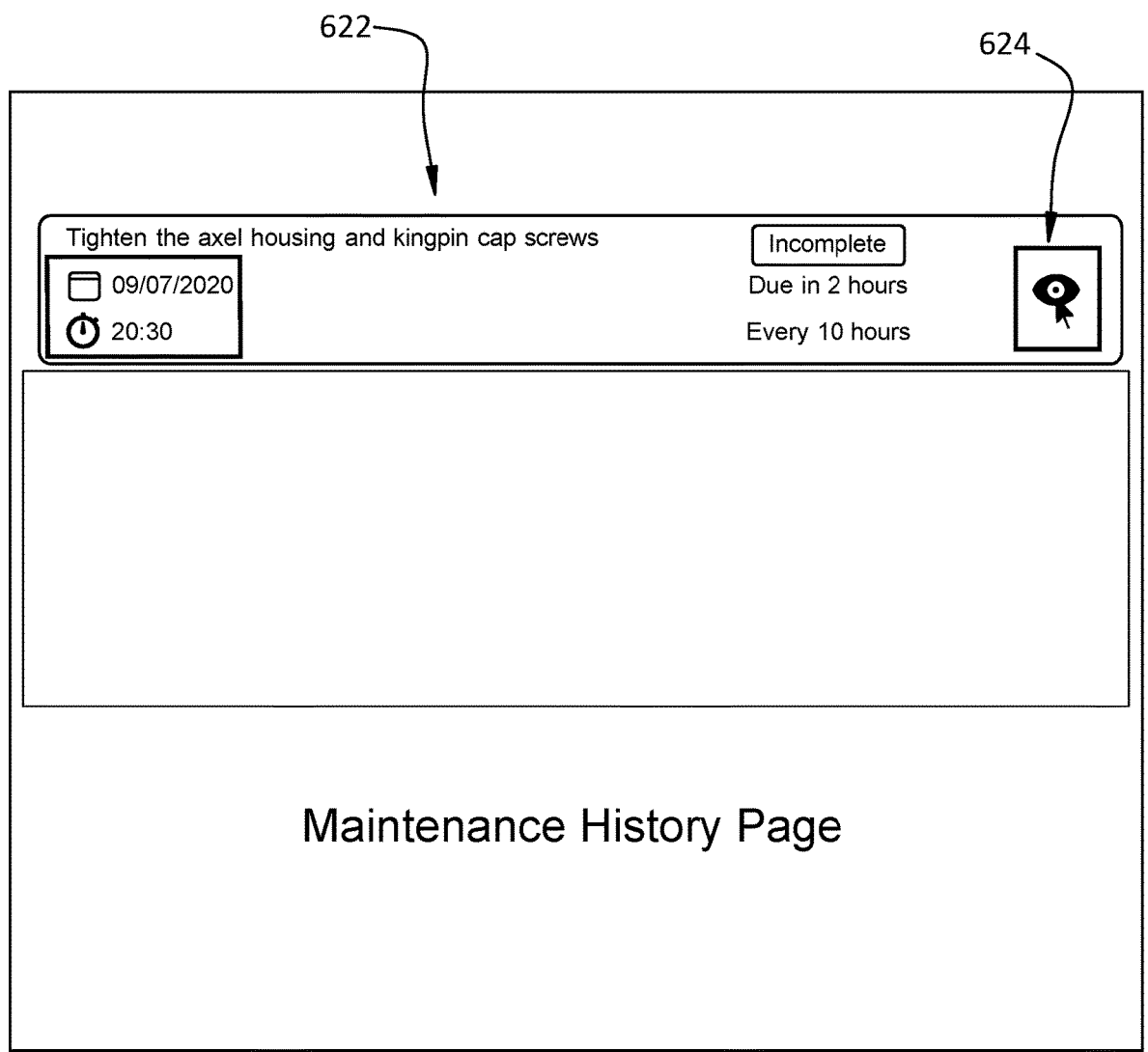
FIG. 6C is an illustration showing a loader maintenance alert image viewable by the operator of the associated tractor that provides further detail in connection with the maintenance alert image of FIG. 6B in accordance with an example embodiment.

FIG. 6C is an illustration showing a loader maintenance history image 620 viewable by the operator of the associated tractor that provides further detail in connection with the maintenance alert image 610 of FIG. 6B in accordance with an example embodiment.

Figure 6D:
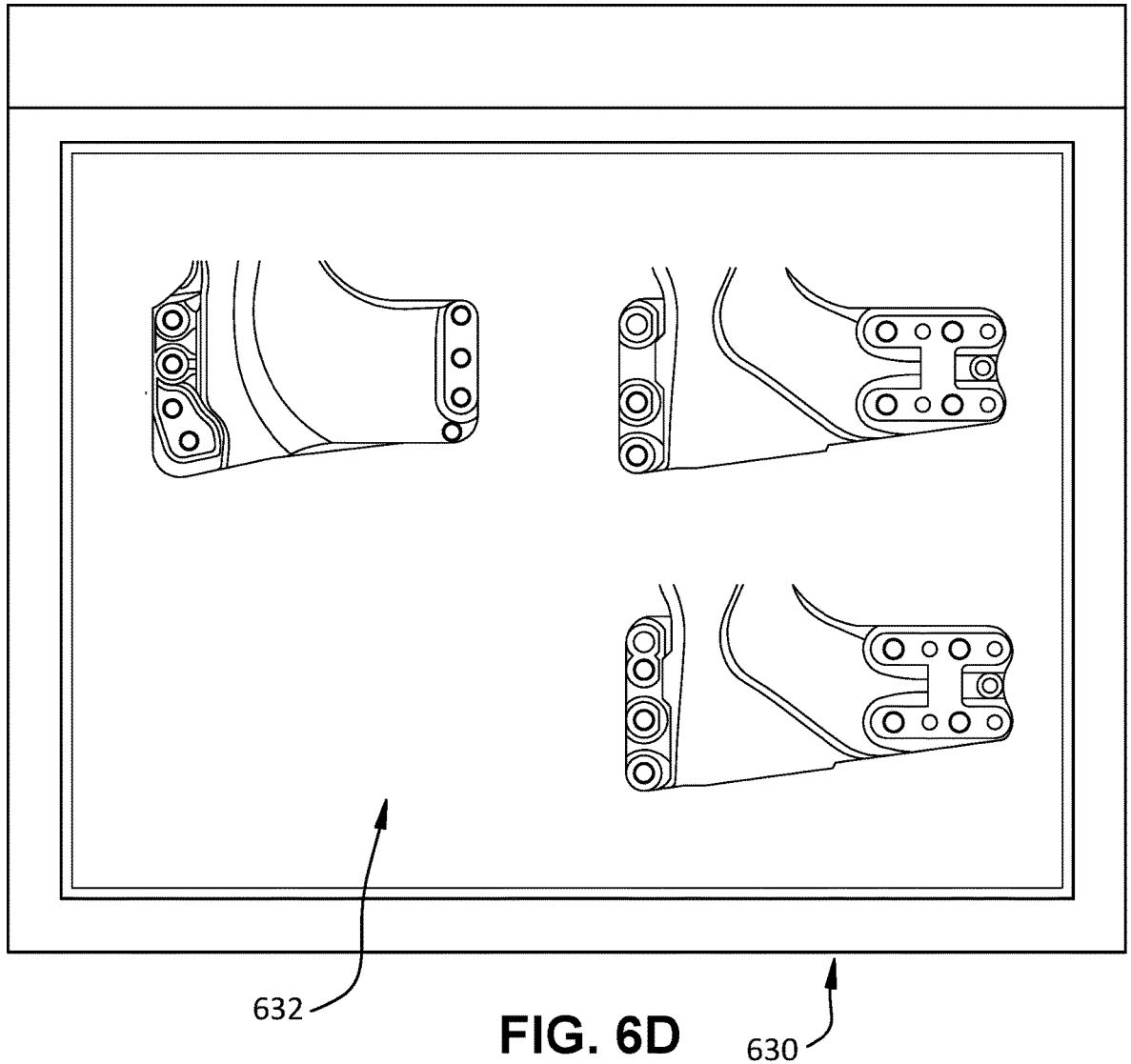
FIG. 6D is an illustration showing a loader maintenance alert image viewable by the operator of the associated tractor that provides further detail in connection with the maintenance alert image of FIG. 6C in accordance with an example embodiment.

In an example embodiment during system use, the operator may select a third virtual maintenance selection indicia 630 portion of the loader maintenance history image 620 that is displayed on the touchscreen 134 using a pointer, finger, or the like. The loader monitoring control apparatus 110 is responsive to the selection of the third virtual maintenance selection indicia 630 by the operator to generate a maintenance instructional image 630 as shown in FIG. 6D. The maintenance instructional image 630 includes instructional information images 632 including for example detailed mechanical drawings or sketches that illustrate a maintenance procedure protocol.

Figure 7:
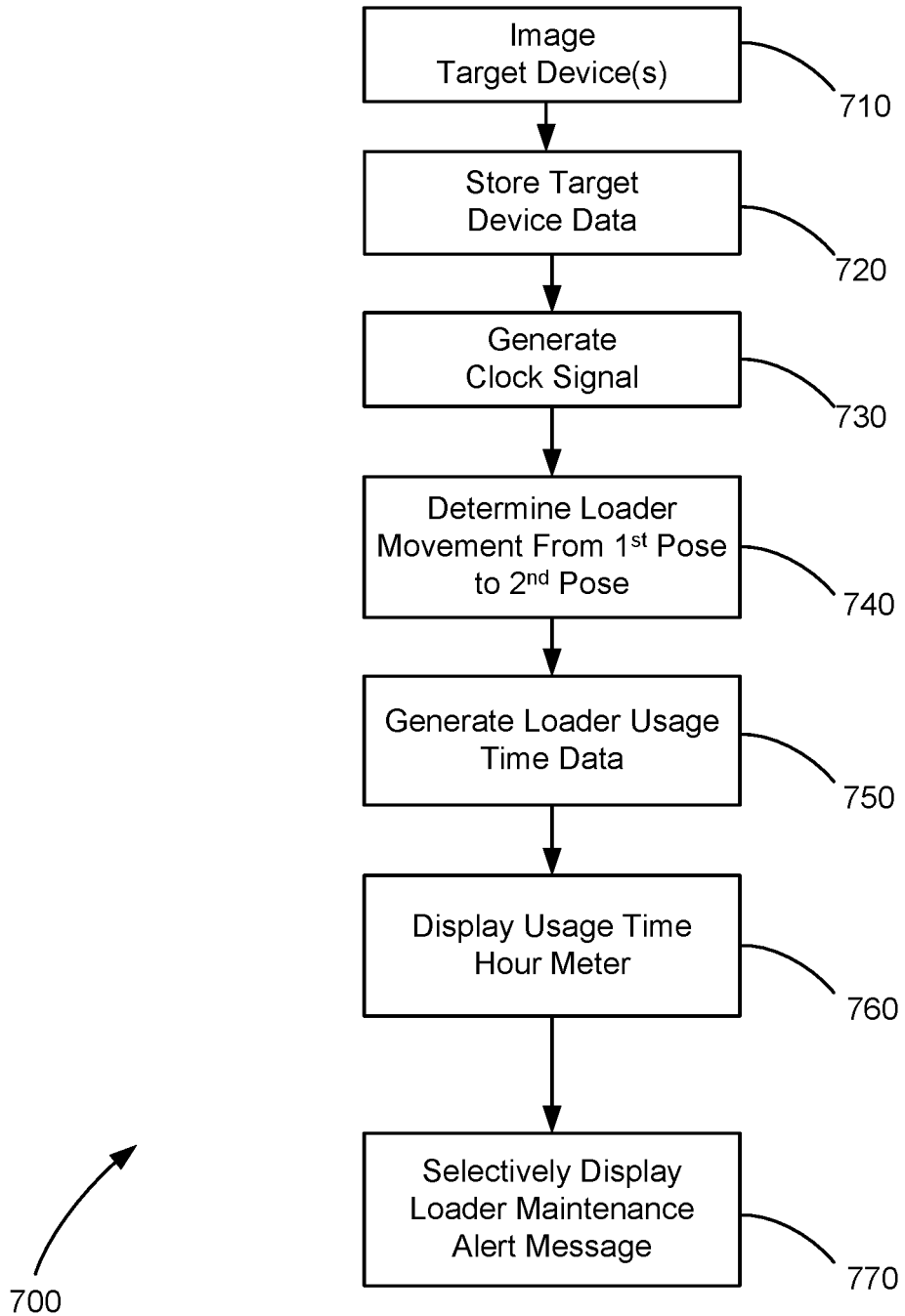
FIG. 7 is a flow diagram showing a method of monitoring operation of equipment mounted on a work vehicle in accordance with an example embodiment.

FIG. 7 is a flow diagram showing a method 700 of monitoring operation of equipment mounted on a work vehicle in accordance with an example embodiment. With reference not to that Figure, At 710 an image of one or more target devices is obtained. In this connection, the vision system 120 images a set of one or more target devices 310 carried on the loader 10 to obtain target device data representative of an image of the set of one or more target devices.

At 720 obtained target device data is stored in a memory device 210 of the apparatus 100. The target device data obtained by the vision system 120 is stored together with loader monitoring logic 211 in a non-transient memory device 210 of a loader monitoring control apparatus 110 operatively coupled with the vision system 120 and comprising a processor device 204 operatively coupled with the memory device 210.

At 730 a clock signal is generated by a clock circuit operatively coupled with the processor device 204, wherein the clock signal is representative of a current time.

At 740 movement of the loader is determined to a second pose from a first pose based on the image data obtained by the vision system 120. Loader monitoring logic 211 is executed by the processor device 204 determine, based on the target device data, a current loader movement of the loader 10 from a first loader pose to a second loader pose.

At 750 loader usage time data is generated. The loader usage time data is based on a sum of a first time duration of a current loader movement and an aggregated time duration of one or more previously determined loader movements of the loader.

At 760 loader usage time is displayed as a loader usage hour meter. A loader total aggregated usage time image viewable by the operator of the associated tractor 2 and representative of an aggregated quantity of time from a predetermined start time point of the loader moving is displayed on the screen 132 of the display unit 130.

At 770 a loader maintenance alert message is selectively displayed. A loader maintenance alert image is displayed on a screen 132 of a display unit 130 based on the generated loader maintenance alert data. The loader maintenance alert image is viewable by the operator, and includes loader maintenance notification information to alert the operator of required loader maintenance.

It is to be understood that other embodiments will be utilized and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible in light of the above teachings. It is therefore intended that the scope of the claims not be limited by this detailed description.

The invention claimed is:

1. An apparatus for monitoring operation of a loader carried on an associated tractor, the apparatus comprising:
 a vision system operable to image a set of one or more target devices carried on the loader to generate target device data representative of the image of the set of one or more target devices;
 a loader monitoring control apparatus operatively coupled with the vision system, the loader monitoring control apparatus comprising:
  a processor device;
  a non-transient memory device operatively coupled with the processor device and storing the target device data;
  a clock circuit operatively coupled with the processor device, the clock circuit generating a clock signal representative of a current time; and
  loader monitoring logic stored in the memory device; and
 a display unit operatively coupled with the loader monitoring control apparatus and comprising a screen that is viewable by an operator of the associated tractor,
 wherein the processor device is operable to execute the loader monitoring logic to:
  determine, based on the target device data, a current loader movement of the loader from a first loader pose to a second loader pose;
  generate, based on determining the current loader movement and the clock signal, first loader usage time data representative of a first time duration of the current loader movement; and
  generate loader maintenance alert data based on a sum of: i) the first time duration of the current loader movement; and ii) an aggregated time duration of one or more previously determined loader movements of the loader exceeding a predetermined loader maintenance time threshold,
 wherein the display unit is operable to display on the screen, based on the generated loader maintenance alert data, a loader maintenance alert image viewable by the operator of the associated tractor and comprising loader maintenance notification information to alert the operator of required loader maintenance.

2. The apparatus according to claim 1, wherein:
 the display unit is operable to display on the screen, based on the sum of the first time duration of the current loader movement and the aggregated time duration of the one or more previously determined loader movements of the loader, a loader total aggregated usage time image viewable by the operator of the associated tractor and representative of an aggregated quantity of time from a predetermined start time point of the loader moving.

3. The apparatus according to claim 1, wherein:
the processor device is operable to execute the loader monitoring logic to determine the current loader movement by:
- determining the first loader pose of the loader based on first target device data representative of an image of the set of one or more target devices generated by the vision system at a first time;
- determining the second loader pose of the loader based on second target device data representative of an image of the set of one or more target devices generated by the vision system at a second time after the first time; and
- determining the current loader movement of the loader between the first and second times based on a difference in a comparison between the determined first and second loader poses.

4. The apparatus according to claim 3, wherein the determining the current loader movement of the loader between the first and second times based on the difference in the comparison between the determined first and second loader poses comprises:
- determining the current loader movement of the loader between the first and second times based on a difference above a predetermined minimum incremental loader movement threshold in the comparison between the determined first and second loader poses.

5. The apparatus according to claim 1, wherein:
the vision system is operable to generate boom target device data representative of an image of a set of one or more boom target devices carried on a boom of the loader;
the processor device is operable to execute the loader monitoring logic to:
- determine, based on the boom target device data, a current boom movement of the boom from a first boom pose to a second boom pose;
- generate, based on determining the current boom movement and the clock signal, first boom usage time data representative of a first time duration of the current boom movement; and
- generate boom maintenance alert data based on a sum of: i) the first time duration of the current boom movement; and ii) an aggregated time duration of one or more previously determined loader movements of the boom exceeding a predetermined boom maintenance time threshold,
wherein the display unit is operable to display on the screen, based on the generated boom maintenance alert data, a boom maintenance alert image viewable by the operator of the associated tractor and comprising boom maintenance notification information to alert the operator of required boom maintenance.

6. The apparatus according to claim 5, wherein:
the vision system is operable to generate tool carrier target device data representative of an image of a set of one or more tool carrier target devices carried on a tool carrier of the loader;
the processor device is operable to execute the loader monitoring logic to:
- determine, based on the tool carrier target device data, a current tool carrier movement of the tool carrier from a first tool carrier pose to a second tool carrier pose;
- generate, based on determining the current tool carrier movement and the clock signal, first tool carrier usage time data representative of a first time duration of the current tool carrier movement; and
- generate tool carrier maintenance alert data based on a sum of: i) the first time duration of the current tool carrier movement; and ii) an aggregated time duration of one or more previously determined tool carrier movements of the tool carrier exceeding a predetermined carrier maintenance time threshold,
wherein the display unit is operable to display on the screen, based on the generated tool carrier maintenance alert data, a tool carrier maintenance alert image viewable by the operator of the associated tractor and comprising tool carrier maintenance notification information to alert the operator of required tool carrier maintenance.

7. The apparatus according to claim 1, wherein:
the vision system is operable to generate boom target device data representative of an image of a set of one or more boom target devices carried on a boom of the loader;
the vision system is operable to generate tool carrier target device data representative of an image of a set of one or more tool carrier target devices carried on a tool carrier of the loader;
the processor device is operable to execute the loader monitoring logic to:
- determine, based on the boom target device data, a current boom movement of the boom from a first boom pose to a second boom pose;
- generate, based on determining the current boom movement and the clock signal, first boom usage time data representative of a first time duration of the current boom movement;
- determine, based on the tool carrier target device data, a current tool carrier movement of the tool carrier from a first tool carrier pose to a second tool carrier pose;
- generate, based on determining the current tool carrier movement and the clock signal, first tool carrier usage time data representative of a first time duration of the current tool carrier movement;
- generate the loader maintenance alert data based on:
  - a sum of: i) the first time duration of the current boom movement; and ii) an aggregated time duration of one or more previously determined loader movements of the boom exceeding a predetermined boom maintenance time threshold; and/or
  - on a sum of: i) the first time duration of the current tool carrier movement; and ii) an aggregated time duration of one or more previously determined tool carrier movements of the tool carrier exceeding a predetermined carrier maintenance time threshold,
wherein the display unit is operable to display on the screen, based on the generated loader maintenance alert data, a loader maintenance alert image viewable by the operator of the associated tractor and comprising loader maintenance notification information to alert the operator of required maintenance of one or more of the boom and/or the tool carrier of the loader.

8. The apparatus according to claim 1, wherein:
wherein the processor device is operable to execute the loader monitoring logic to:
- increment, for each determined current loader movement, aggregated time duration data stored in the memory device and representative of the aggregated time duration of the one or more previously determined loader movements.

9. The apparatus according to claim 1, further comprising:
an operator input device operatively coupled with the loader monitoring control apparatus and configured to receive a query signal from the operator of the associated tractor,
wherein the memory device comprises a database storing a plurality of sets of query response data representative of detailed information relating to a plurality of loader maintenance instruction sets,
wherein the processor device is operable to execute the loader monitoring logic to:
retrieve a first set of query response data from the memory device based on the received query signal and the generated loader maintenance alert data,
wherein the display unit is operable to display on the screen, based on the retrieved first set of query response data, one or more loader maintenance instructional images viewable by the operator of the associated tractor and comprising detailed instructions for use by the operator in effecting the required loader maintenance.

10. The apparatus according to claim 1, further comprising:
an operation environment sensor operatively coupled with the loader monitoring control apparatus and configured to generate an operation environment condition signal representative of an operational condition of the loader,
wherein the processor device is operable to execute the loader monitoring logic to:
generate work environment sensitive loader maintenance alert data based on a sum of: i) a product of environmental condition data representative of the operation environment condition signal and the first time duration of the current loader movement; and ii) the aggregated time duration of the one or more previously determined loader movements of the loader exceeding the predetermined loader maintenance time threshold,
wherein the display unit is operable to display on the screen, based on the generated work environment sensitive loader maintenance alert data, a work environment sensitive loader maintenance alert image viewable by the operator of the associated tractor and comprising loader maintenance notification information to alert the operator of required loader maintenance.

11. The apparatus according to claim 1, further comprising:
an operator input device operatively coupled with the loader monitoring control apparatus and configured to receive an operation environment condition signal representative of an operational condition of the loader from the operator of the associated tractor,
wherein the processor device is operable to execute the loader monitoring logic to:
generate work environment sensitive loader maintenance alert data based on a sum of: i) a product of environmental condition data representative of the operation environment condition signal and the first time duration of the current loader movement; and ii) the aggregated time duration of the one or more previously determined loader movements of the loader exceeding the predetermined loader maintenance time threshold,
wherein the display unit is operable to display on the screen, based on the generated work environment sensitive loader maintenance alert data, a work environment sensitive loader maintenance alert image viewable by the operator of the associated tractor and comprising loader maintenance notification information to alert the operator of required loader maintenance.

12. A method of monitoring operation of a loader carried on an associated tractor, the method comprising:
imaging by a vision system a set of one or more target devices carried on the loader to obtain target device data representative of an image of the set of one or more target devices;
storing the target device data and loader monitoring logic in a non-transient memory device of a loader monitoring control apparatus operatively coupled with the vision system and comprising a processor device operatively coupled with the memory device;
generating, by a clock circuit operatively coupled with the processor device, a clock signal representative of a current time;
executing the loader monitoring logic by the processor device to:
determine, based on the target device data, a current loader movement of the loader from a first loader pose to a second loader pose;
generate, based on determining the current loader movement and the clock signal, first loader usage time data representative of a first time duration of the current loader movement; and
generate loader maintenance alert data based on a sum of: i) the first time duration of the current loader movement; and ii) an aggregated time duration of one or more previously determined loader movements of the loader exceeding a predetermined loader maintenance time threshold; and
displaying based on the generated loader maintenance alert data a loader maintenance alert image on a screen of a display unit operatively coupled with the loader monitoring control apparatus and viewable by the operator, the loader maintenance alert image comprising loader maintenance notification information to alert the operator of required loader maintenance.

13. The method according to claim 12, further comprising:
displaying on the screen of the display unit, based on the sum of the first time duration of the current loader movement and the aggregated time duration of the one or more previously determined loader movements of the loader, a loader total aggregated usage time image viewable by the operator of the associated tractor and representative of an aggregated quantity of time from a predetermined start time point of the loader moving.

14. The method according to claim 12, wherein the executing the loader monitoring logic by the processor device to determine the current loader movement comprises:
executing the loader monitoring logic by the processor device to determine the current loader movement by:
determining the first loader pose of the loader based on first target device data representative of an image of the set of one or more target devices generated by the vision system at a first time;
determining the second loader pose of the loader based on second target device data representative of an image of the set of one or more target devices generated by the vision system at a second time after the first time; and determining the current loader movement of the loader between the first and second times based on a difference in a comparison between the determined first and second loader poses.

15. The method according to claim 14, wherein the executing the loader monitoring logic by the processor device to determine the current loader movement of the loader between the first and second times based on the difference in the comparison between the determined first and second loader poses comprises:

executing the loader monitoring logic by the processor device to determine the current loader movement of the loader between the first and second times based on the difference in the comparison between the determined first and second loader poses being above a predetermined minimum incremental loader movement threshold.

16. The method according to claim 12, further comprising:

imaging by the vision system a set of one or more boom target devices carried on a boom of the loader to generate boom target device data representative of an image of the set of one or more boom target devices;

executing the loader monitoring logic by the processor device to:
 determine, based on the boom target device data, a current boom movement of the boom from a first boom pose to a second boom pose;
 generate, based on determining the current boom movement and the clock signal, first boom usage time data representative of a first time duration of the current boom movement; and
 generate boom maintenance alert data based on a sum of: i) the first time duration of the current boom movement; and ii) an aggregated time duration of one or more previously determined loader movements of the boom exceeding a predetermined boom maintenance time threshold; and displaying based on the generated boom maintenance alert data a boom maintenance alert image on the screen of the display unit and viewable by the operator, the boom maintenance alert image comprising boom maintenance notification information to alert the operator of required boom maintenance.

17. The method according to claim 16, further comprising:

imaging by the vision system a set of one or more tool carrier target devices carried on a tool carrier of the loader to generate tool carrier target device data representative of an image of the set of one or more tool carrier target devices;

executing the loader monitoring logic by the processor device to:
 determine, based on the tool carrier target device data, a current tool carrier movement of the tool carrier from a first tool carrier pose to a second tool carrier pose;
 generate, based on determining the current tool carrier movement and the clock signal, first tool carrier usage time data representative of a first time duration of the current tool carrier movement; and
 generate tool carrier maintenance alert data based on a sum of: i) the first time duration of the current tool carrier movement; and ii) an aggregated time duration of one or more previously determined tool carrier movements of the tool carrier exceeding a predetermined carrier maintenance time threshold; and displaying based on the generated boom maintenance alert data a tool carrier maintenance alert image on the screen of the display unit and viewable by the operator, the tool carrier maintenance alert image comprising tool carrier maintenance notification information to alert the operator of required tool carrier maintenance.

18. The method according to claim 12, further comprising:

imaging by the vision system a set of one or more boom target devices carried on a boom of the loader to generate boom target device data representative of an image of the set of one or more boom target devices;

imaging by the vision system a set of one or more tool carrier target devices carried on a tool carrier of the loader to generate tool carrier target device data representative of an image of the set of one or more tool carrier target devices;

executing the loader monitoring logic by the processor device to:
 determine, based on the boom target device data, a current boom movement of the boom from a first boom pose to a second boom pose;
 generate, based on determining the current boom movement and the clock signal, first boom usage time data representative of a first time duration of the current boom movement;
 determine, based on the tool carrier target device data, a current tool carrier movement of the tool carrier from a first tool carrier pose to a second tool carrier pose;
 generate, based on determining the current tool carrier movement and the clock signal, first tool carrier usage time data representative of a first time duration of the current tool carrier movement;
 generate the loader maintenance alert data based on:
  a sum of: i) the first time duration of the current boom movement; and ii) an aggregated time duration of one or more previously determined loader movements of the boom exceeding a predetermined boom maintenance time threshold; and/or
  on a sum of: i) the first time duration of the current tool carrier movement; and ii) an aggregated time duration of one or more previously determined tool carrier movements of the tool carrier exceeding a predetermined carrier maintenance time threshold; and displaying on the screen of the display unit based on the generated loader maintenance alert data, a loader maintenance alert image viewable by the operator of the associated tractor and comprising loader maintenance notification information to alert the operator of required maintenance of one or more of the boom and/or the tool carrier of the loader.

19. The method according to claim 12, further comprising:

executing the loader monitoring logic by the processor device to:
 increment, for each determined current loader movement, aggregated time duration data stored in the memory device and representative of the aggregated time duration of the one or more previously determined loader movements.

20. The method according to claim 12, further comprising:
receiving, by an operator input device operatively coupled with the loader monitoring control apparatus, a query signal from the operator of the associated tractor;
storing in a database of the memory device a plurality of sets of query response data representative of detailed information relating to a plurality of loader maintenance instruction sets;
executing the loader monitoring logic by the processor device to:
retrieve a first set of query response data from the memory device based on the received query signal and the generated loader maintenance alert data; and
displaying on the screen of the display unit based on the retrieved first set of query response data, one or more loader maintenance instructional images viewable by the operator of the associated tractor and comprising detailed instructions for use by the operator in effecting the required loader maintenance.

21. The method according to claim 12, further comprising:
generating an operation environment condition signal representative of an operational condition of the loader by an operation environment sensor operatively coupled with the loader monitoring control apparatus and configured to generate an operation environment condition signal representative of an operational condition of the loader;
executing the loader monitoring logic by the processor device to:
generate work environment sensitive loader maintenance alert data based on a sum of: i) a product of environmental condition data representative of the operation environment condition signal and the first time duration of the current loader movement; and ii) the aggregated time duration of the one or more previously determined loader movements of the loader exceeding the predetermined loader maintenance time threshold; and
displaying on the screen of the display unit, based on the generated work environment sensitive loader maintenance alert data, a work environment sensitive loader maintenance alert image viewable by the operator of the associated tractor and comprising loader maintenance notification information to alert the operator of required loader maintenance.

* * * * *